United States Patent
Radi

(10) Patent No.: US 8,540,030 B2
(45) Date of Patent: *Sep. 24, 2013

(54) RISER LIFECYCLE MANAGEMENT SYSTEM, PROGRAM PRODUCT, AND RELATED METHODS

(75) Inventor: Amin Radi, Seabrook, TX (US)

(73) Assignee: Vetco Gray Inc., Houston, TX (US)

( * ) Notice: Subject to any disclaimer, the term of this patent is extended or adjusted under 35 U.S.C. 154(b) by 6 days.

This patent is subject to a terminal disclaimer.

(21) Appl. No.: 13/300,155

(22) Filed: Nov. 18, 2011

(65) Prior Publication Data

US 2012/0061091 A1    Mar. 15, 2012

Related U.S. Application Data

(63) Continuation of application No. 12/029,376, filed on Feb. 11, 2008, now Pat. No. 8,074,720.

(51) Int. Cl.
*E21B 17/01* (2006.01)
*E21B 47/00* (2012.01)

(52) U.S. Cl.
USPC ........... 166/350; 166/336; 166/352; 166/367; 166/250.01; 166/64; 405/224.2; 702/6

(58) Field of Classification Search
USPC ................. 166/350, 336, 351, 352, 359, 360, 166/367, 250.01, 377–380, 64; 405/224.2, 405/224.4; 73/800; 702/6, 9; 175/7
See application file for complete search history.

(56) References Cited

U.S. PATENT DOCUMENTS

| | | | | |
|---|---|---|---|---|
| 4,205,379 A * | 5/1980 | Fox et al. | | 701/116 |
| 4,317,174 A * | 2/1982 | Dean | | 701/116 |
| 5,088,859 A * | 2/1992 | Devlin | | 405/211 |
| 5,202,680 A * | 4/1993 | Savage | | 340/853.1 |
| 5,240,446 A * | 8/1993 | Boatman et al. | | 441/3 |
| 5,361,838 A * | 11/1994 | Kilgore | | 166/254.2 |
| 5,372,531 A * | 12/1994 | Boatman et al. | | 441/4 |
| 5,429,190 A * | 7/1995 | Kilgore et al. | | 166/255.1 |
| 5,553,504 A * | 9/1996 | Lyons et al. | | 73/799 |
| 5,777,239 A * | 7/1998 | Fuglewicz | | 73/862.68 |
| 5,978,739 A * | 11/1999 | Stockton | | 702/6 |
| 6,364,021 B1 * | 4/2002 | Coats | | 166/350 |
| 6,588,985 B1 * | 7/2003 | Bernard | | 405/191 |

(Continued)

OTHER PUBLICATIONS

Chedzoy, C. et al., Design Challenges of Deepwater Dry Tree Riser Systems For Different Vessel Types, 2003.

(Continued)

*Primary Examiner* — Matthew Buck

(74) *Attorney, Agent, or Firm* — Bracewell & Giuliani LLP

(57) ABSTRACT

Methods, systems, and program product for monitoring and managing a plurality of marine riser assets are provided. An example of a method includes tracking the subsea deployment and retrieval of each of a plurality of riser joints. This can include deploying the plurality of riser joints from a vessel to form an operationally deployed marine riser string, reading riser joint identification data from a riser joint identification indicator connected to the respective riser joint during the operational deployment thereof, and identifying the respective riser joint being operationally deployed to thereby track the deployment thereof. The method can also include retrieving one or more of the operationally deployed riser joints, reading riser joint identification data from the riser identification indicator of the respective riser joint during retrieval thereof, identifying the respective one or more riser joints being retrieved to thereby track the retrieval thereof.

35 Claims, 7 Drawing Sheets

(56) References Cited

U.S. PATENT DOCUMENTS

| | | | |
|---|---|---|---|
| 6,932,542 B2* | 8/2005 | Chianis et al. | 405/223.1 |
| 7,014,100 B2* | 3/2006 | Zierolf | 235/375 |
| 7,080,689 B2* | 7/2006 | Guesnon et al. | 166/355 |
| 7,194,913 B2* | 3/2007 | Morrison et al. | 73/800 |
| 7,252,159 B2* | 8/2007 | Baek et al. | 175/7 |
| 7,328,741 B2* | 2/2008 | Allen et al. | 166/64 |
| 7,540,200 B2* | 6/2009 | Yung et al. | 73/807 |
| 7,677,439 B2* | 3/2010 | Zierolf | 235/375 |
| 7,766,580 B2* | 8/2010 | Dartford et al. | 405/216 |
| 8,074,720 B2* | 12/2011 | Radi | 166/350 |
| 2005/0100414 A1* | 5/2005 | Salama | 405/224.2 |
| 2006/0065401 A1* | 3/2006 | Allen et al. | 166/345 |
| 2008/0128138 A1* | 6/2008 | Radi | 166/350 |
| 2008/0289876 A1* | 11/2008 | King et al. | 175/40 |

OTHER PUBLICATIONS

International Search Report and Written Opinion for related PCT Application PCT/US09/33826, 2009.

* cited by examiner

Fig. 2A

RISER LIFECYCLE MANAGEMENT SYSTEM, PROGRAM PRODUCT, AND RELATED METHODS

RELATED APPLICATIONS

This application is a continuation of U.S. patent application Ser. No. 12/029,376, titled "Riser Lifecycle Management System, Program Product, and Related Methods," filed on Feb. 11, 2008, incorporated herein by reference in its entirety.

BACKGROUND OF THE INVENTION

1. Field of the Invention

The present invention relates to riser management systems. More particularly, the present invention relates to a system, program product, and related methods for monitoring and managing a plurality of marine riser assets.

2. Description of Related Art

A problem presented by offshore hydrocarbon drilling and producing operations conducted from a floating platform or vessel is the need to establish a sealed fluid pathway between each borehole or well at the ocean floor and the work deck of the vessel at the ocean surface. This sealed fluid pathway is typically provided by a drilling riser system. Drilling risers, which are utilized for offshore drilling, extend from the drilling rig to a blowout preventer (BOP). Similarly, production risers extend from and provide communication between a subsea wellhead system and the floating vessel.

A typical marine drilling riser permits passage of drill pipe which is used for pumping lubricating mud down the well during drilling operations, return of drilling mud that has been pumped through the drill pipe into the main tube of the riser, and any associated drill cuttings, and provides a connection of the drilling vessel to the well above the subsea BOP stack. The drilling riser can be disconnected from the well above the BOP stack, allowing the drilling vessel to retrieve the riser and temporarily move from the drill site should the need arise (i.e., during a hurricane event, or a malfunction). The BOP stack, having remained on the wellhead, provides for containment of a live well while the vessel is not on location. Upon return, the vessel can deploy the riser, reconnect to the BOP stack, and reestablish hydrocarbon communication with the well.

The marine drilling riser also permits control of the well should the BOP stack have to be functioned. This is typically associated with drilling through a zone with geological fluid pressure that is substantially higher than that which the drilling mud can contain. During such events, the BOP is functioned, and well control is re-established by pumping an appropriate density mud thought the kill line and eventually circulating it back to the surface via the choke line. The marine drilling riser also permits improvement of mud circulation velocity. When needed, this is accomplished by pumping additional mud through the booster line and injecting it into the riser bore at the BOP stack. This increases the volume of mud in the riser; improving the return speed. The marine drilling riser further permits delivery of hydraulic fluid to the BOP stack control system. Such fluid is supplied through a dedicated external hydraulic line.

The drilling riser, for example, is typically installed directly from a drilling derrick on the platform of the vessel by connecting a series of riser joints connected together. After connecting the riser to the subsea wellhead on the seabed, the riser is tensioned by buoyancy cans or deck mounted tensioner systems. The riser is projected up through an opening, referred to as a moon pool in the vessel, to working equipment and connections proximate an operational floor on the vessel. In drilling operations, the drill string extends through a drilling riser, with the drilling riser serving to protect the drill string and to provide a return pathway outside the drill string for drilling fluids. Similarly, in producing operations, a production riser is used to provide a pathway for the transmission of oil and gas to the work deck.

Basic components of a riser system typically include, from the mud line and extending to the surface: a hydraulic wellhead connector which permits connection to a subsea wellhead; a BOP stack used for well control; a lower marine riser package which permits disconnect and reconnect of the marine riser at the BOP stack; multiple marine riser joints normally in the form of bare and buoyant joints each outfitted with a choke and kill line, a booster line, and a hydraulic line; and a termination joint which is a special riser joint where external lines are terminated and diverted to the appropriate facility on the vessel. For example, the kill line is terminated and connected to the mud pump via a high pressure flexible line. The components also include a tension ring which provides for the interface of the marine riser to the hydro-pneumatic riser tensioner designed to provide lateral load resistance while providing a somewhat constant vertical tension; and a telescopic joint typically made of two sliding pipes sealed together via an elastomer primarily used is to decouple the motion of the vessel, while permitting the riser tensioner system to apply a near constant tension on the marine riser. The components also include a diverter used for diverting of the unwanted gas in the marine riser; a gimbal located on the rig floor used during running and retrieval of the marine riser to dampen the pitch motion of the vessel, and a marine drilling riser spider used during the mating of each riser section to the next.

Other more specialized riser equipment includes a fill-up valve designed to prevent collapse of the riser pipe due to the differential pressure between the inside of the riser pipe and the surrounding water, an instrument riser joint typically used to monitor the tension and bending due to environmental conditions which allows for adjustment in top tension and vessel positioning, vortex suppression equipment which help suppress vortex induced vibrations typically found in conditions of high current and long riser length, and an emergency riser release which provides a specialized riser release system to prevent catastrophic failure typically found in conditions where incorrect vessel positioning or extreme environmental conditions may occur.

During a typical field installation, the marine riser components are individually lifted from the deck, connected to each other at the riser spider, and run down. Riser joints, which comprise the major length of the riser string, are fabricated in lengths ranging from 50' to 90'. During the running procedure, the portion of the riser string that is fully made up is landed on the riser spider. The next riser joint is then picked up and placed just over the spider, immediately above the suspended riser string. The two riser sections are then joined by means of a mechanical connector, etc. The most common type for a riser joint provides a bolted flange configuration.

Marine risers are subjected to impact loads as well as unexpected side loads, which can damage fragile electronics. Marine risers are also subjected to environmental loads as well as vessel-induced loads. The associated environmental parameters include, among other things, wave height and period, water depth, current, wind, and tides. In the subsea environment, hydrostatic pressure can reach 4,500 psi in current deepwater areas, and probably will reach 5,500 psi within a few years, and the seawater temperature can be as cold as 30° F. The high temperature of the drilling mud could also impact electronic and sensor equipment, particularly electronic equipment attached directly to the riser pipe (joint) body. The vessel-induced loads include the applied top tension necessary to maintain the optimum shape for a riser string, and those imparted by the marine riser string due to motion of the vessel as it is subjected to wave, wind, and current loading. The most critical component of environmental loads is generally the current load directly imparted on the riser string. The current loads typically vary with the water depth, but are generally much stronger near the surface.

Some locations around the world, such as the West of the Shetlands and the Gulf of Mexico, offer unique challenges associated with strong currents. In the Gulf of Mexico, for example, an environmental event establishes a seasonal "Loop Current", which moves in a circular pattern reaching a diameter a hundred miles or more. Such loop currents impart exceptionally high environmental loads on a riser, often for weeks at a time. High current loading can result in shedding of vortices past a marine riser string, which, if coupled with unfavorable riser damping, can result in violent motion of a marine riser string, typically in a cross flow direction. This is commonly referred to as "Vortex Induced Vibration" or "VIV." The large amplitude of the riser motion during a VIV event can result in elevated stress levels in the riser string, which, in turn, dramatically reduces the fatigue life of the individual riser joints. A single fatigue event can potentially result in the catastrophic failure of the marine riser string. Worse yet, a VIV event can take place in higher modes, for example, such as where only a small portion of the riser string, possibly hundreds of feet below the water surface, is excited and experiences VIV. Recognized by the Applicant is that in such a scenario, an observer on the vessel, looking down at the visible portions of the riser string, would see no evidence of this VIV event. Fortunately, catastrophic failure of risers has been few and far between.

A goal or series of goals for both drilling and production risers is to manage stresses and loading of individual riser sections to provide for fatigue analysis, and thus, allow the operator to formulate an enhanced inspection, maintenance, and riser joint rotation program. If a single riser joint in a riser string fails or otherwise exceeds an operational constraint resulting in a requirement for immediate maintenance, an entire riser string may have to be retrieved and rerun. In deepwater operations, it might take two or more days to run or retrieve a marine riser. Given the approximate rate of well over $500,000 per day for a $5^{th}$ generation drilling vessel, such a scenario would cost the operator over a million dollars just to establish communication with the subsea well. This point should illustrate the importance of saving time during the running and retrieving of the riser. It should also illustrate the importance of lost time, and the associated cost, resulting from a riser component failure. There have been, however, until now, no effective systems or methods of efficiently tracking riser assets, efficiently tracking cumulative stress or other loading on each riser asset, or accurately determining or differentiating expected stress levels between vessels or fields in order to properly forecast required maintenance.

Recognized by the Applicant, therefore, is the need for a system, program product, and methods of managing riser assets, especially riser joints, which can provide asset managers a list of all the riser assets allocated to each specific vessel and provide a further breakdown of those assets that are currently deployed, are on deck, or are out for maintenance, along with the expected return date; a list of upcoming scheduled maintenance events; an estimate of the amount of operational life being expended by a particular riser asset; and an estimate of the total amount of cumulative operational life used by a particular riser asset, along with the details of the most damaging events (i.e., a certain hurricane event). Also recognized is the need for a system, program product, and methods of managing riser assets, especially riser joints, which include a central database that can be used by field and maintenance personnel to maintain and communicate critical riser asset information, and that can enhance both routine maintenance scheduling and the process of identifying a requirement for an unscheduled maintenance event. Also recognized is the need for such a system, program product, and methods which can provide detailed information on riser maintenance history and critical/relevant manufacturing information, and provide a capability to properly track riser assets so that they can be moved from one vessel to another with their history intact.

Further recognized is the need for such a system, program product, and methods which can provide a time stamp for each riser deployment to permit the determination of where, in the water column, each riser asset was located for any particular drilling or production campaign, which can, in turn, provide the user with information to reconstruct a riser string configuration of any particular deployment to thereby analyze riser asset performance and preferred positioning. Also recognized is the need for a system, program product, and methods which can allow a user to optimally position a specific riser joint at a specific position (depth) along the riser string, for example, based on an amount of operational life available (remaining), for example, in order to match a riser joints having a high amount of operational life remaining with riser string depths expected to encounter a higher stress.

Still further, recognized is the need for a system, program product, and methods of managing riser assets, especially riser joints, which include provisions for controlling a riser tensioning system to extend the operational life of the various riser assets and to control riser performance such as, for example, when encountering vortex induced vibration.

SUMMARY OF THE INVENTION

In view of the foregoing, various embodiments of the present invention advantageously provide a system, program product, and methods of managing riser assets, especially riser joints, which can provide asset managers a list of all the riser assets allocated to each specific vessel and provide a further breakdown of those assets that are currently deployed, are on deck, or are out for maintenance, along with the expected return date; a list of upcoming scheduled maintenance events; an estimate of the amount of operational like being expanded by a particular riser asset; and an estimate of the total amount of operational life used by a particular riser asset, along with the details of the most damaging events (i.e., a certain hurricane event). Various embodiments of the present invention also provide a system, program product, and methods of managing riser assets, especially riser joints, which include a central database that can be used by field and maintenance personnel to maintain and communicate critical riser information, and that can enhance both routine maintenance scheduling and identifying a need for an unscheduled maintenance event.

Various embodiments of the present invention also provide a system, program product, and methods which can provide detailed information on riser asset maintenance history and critical/relevant manufacturing information; and which can provide the capability to properly track riser assets so that they can be moved from one vessel to another with their history intact. Various embodiments of the present invention also provide a system, program product, and methods which can provide a time stamp for each riser asset deployment to permit the determination of where, in the water column, each riser asset was located for any particular drilling campaign, which can, in turn, provide the user with information to reconstruct a riser string configuration of any particular deployment to thereby analyze riser asset performance and preferred positioning. Various embodiments of the present invention also provide a system, program product, and methods that can allow a user to optimally position a specific riser joint at a specific position (depth) along the riser string, for example, based on an amount of operational life available (remaining), for example, in order to match a riser joints having a high amount of operational life remaining with riser string depths expected to encounter a higher stress. Various embodiments of the present invention also provide a system, program product, and methods of managing riser assets, especially riser joints, which include provisions for controlling a riser tensioning system to extend the operational life of the various riser assets and to control riser performance such as, for example, when encountering vortex induced vibration.

More specifically, various embodiments the present invention provide methods of monitoring and managing a plurality of marine assets. An exemplary method can include the steps of operationally deploying a plurality of riser joints from a vessel to form an operationally deployed marine riser string, reading riser joint identification data from a riser joint identification indicator connected to the respective riser joint, for each of the plurality of riser joints during the operational deployment thereof using a riser joint identification sensor (e.g., RFID, barcode, or contact memory reader), and identifying the respective riser joint being operationally deployed to thereby track the deployment thereof responsive to the riser joint identification data read from the respective riser joint identification indicator. The method also includes retrieving one or more riser joints of the plurality of operationally deployed riser joints, reading riser joint identification data from the riser identification indicator of the respective one or more riser joints during retrieval thereof; and identifying the respective one or more riser joints being retrieved to thereby track the retrieval thereof responsive to the riser joint identification data read from the respective riser joint identification indicator. According to an exemplary configuration, each riser joint identification indicator connected to a separate one of the plurality of riser joints contains or carries information about the respective riser joint sufficient to separately identify each of the plurality of riser joints being deployed and retrieved from each other of the plurality of riser joints during subsea deployment. Utilizing the indicia, the method also includes tracking the subsea deployment and retrieval of each of the plurality of riser joints. The method can also include recording a timestamp indicating when each respective riser joint of the plurality of riser joints is deployed, and recording a timestamp indicating when each respective riser joint of the plurality of riser joints is retrieved.

According to an embodiment of the present invention, the method can also include receiving riser joint identification data from a riser joint identification sensor positioned within a well bay of the vessel during deployment of the plurality of riser joints, and virtually constructing (reconstructing) the marine riser string configuration responsive to the riser joint identification data for each of the plurality of riser joints received during deployment thereof. The method can also include determining a relative deployed position location of the each of the plurality of riser joints deployed from the vessel. The relative deployed location comprises a relative deployed position location of the respective riser joint along a length of the deployed marine riser string relative to each other of the plurality of deployed riser joints, the water line, or other physician reference.

The method can also include the step of receiving load data for each of the plurality of riser joints from a plurality of riser joint measurement instrument modules. The load data is provided through relay of the data from each of the plurality of riser joints to a riser joint positioned adjacent the respective riser joint until reaching a riser load data receiver. The method can also or alternatively include the step of receiving load data for each of the plurality of riser joints from a corresponding plurality of riser joint measurement instrument modules, monitoring loading of each of the plurality of deployed riser joints responsive to the load data provided by the plurality of riser joint measurement instrument modules, estimating a riser joint loading condition for each of the plurality of deployed riser joints responsive to the load data of one or more of the plurality of deployed riser joints, and providing an alarm responsive to the estimated loading condition nearing an operating design or service envelope of one or more of the plurality of deployed riser joints. The steps can also include estimating fatigue damage to each of the plurality of deployed riser joints responsive to the load data of the one or more of the plurality of deployed riser joints, and providing an alarm responsive to the estimated fatigue damage of one or more of the plurality of deployed riser joints exceeding a preselected operational limit. The steps can further include detecting an anomaly in the load data of one or more of the plurality of deployed riser joints when existing, and providing an alarm responsive to the detection of the anomaly.

The method can also or alternatively include the step of receiving load data for each of the plurality of riser joints from a plurality of riser joint measurement instrument modules, whereby the load data is provided through relay of the data from each of the plurality of riser joints to a riser joint positioned adjacent the respective riser joint until reaching a riser load data receiver. The steps can also include monitoring loading of each of the plurality of deployed riser joints responsive to the load data provided by the plurality of riser joint measurement instrument modules, monitoring tensioning system tension settings, applied riser tension, and tensioner stroke, and providing data to control adjusting the tensioning system tension settings to automatically continually apply optimum riser tension responsive to the load data.

Various embodiments of the present invention also provide various methods relating to monitoring and managing a plurality of marine riser assets. According to an embodiment of the present invention, a method of monitoring and managing a plurality of marine riser assets can include the steps of receiving riser joint identification data from a riser joint identification sensor positioned within a well bay, and determining a relative deployed position location of each of a plurality of riser joints deployed from the vessel to form a marine riser string. Each of the riser joints correspondingly include indicia readable by a riser joint identification sensor to separately identify each one of the plurality of riser joints from each other of the plurality of riser joints. The method can also include receiving load data for each of the plurality of riser joints from a plurality of riser joint measurement instrument modules which can each be connected to a corresponding one of the plurality of deployed riser joints, and monitoring loading of each of the plurality of deployed riser joints responsive to the load data provided by the plurality of riser joint measurement instrument modules.

According to another embodiment of the present invention, a method of monitoring and managing a plurality of marine riser assets includes the steps of determining a relative deployed position location of the each of a plurality of riser joints deployed from a vessel and having indicia readable by a riser joint identification sensor to separately identify each one of the plurality of riser joints from each other of the plurality of riser joints during deployment thereof, receiving load data for each of the plurality of deployed riser joints from a plurality of riser joint measurement instrument modules connected to at least a subset of the plurality of deployed riser joints, monitoring loading of each of the plurality of deployed riser joints responsive to the load data provided by the plurality of riser joint measurement instrument modules, estimating a riser joint loading condition for each of the plurality of deployed riser joints responsive to the load data of one or more of the plurality of deployed riser joints, and providing an alarm responsive to the estimated loading condition nearing an operating design or service envelope for one or more of the plurality of deployed riser joints.

According to another embodiment of the present invention, a method of monitoring and managing a plurality of marine riser assets positioned at one or more separate vessel locations can include the steps of receiving riser joint deployment and location data for each one of a plurality of deployed riser joints deployed at one of a plurality of separate vessel locations carrying the respective riser joint, receiving riser joint load history data for each of the plurality of riser joints deployed at the plurality of separate vessel locations from an associated shipboard computer, transforming riser joint load history data received in the time domain into load history data in the frequency domain, and determining a level of damage of each of the plurality of deployed riser joints responsive to at least one of the following: the received riser joint load history data or the transformed riser joint load history data.

Various embodiments of the present invention also provide a riser lifecycle management system for monitoring and managing a plurality of marine riser assets positionable at one or more separate floating vessels each generally having a floor, a well bay extending therethrough, a local shipboard communication network carried by the vessel, and a shipboard computer in communication with the local shipboard communication network and including a processor, and memory coupled to the processor to store operating instructions therein. The system, according to an embodiment of the present invention, includes the vessel, a riser joint identification sensor positioned at or adjacent the well bay and operably coupled to the shipboard communication network, and a plurality of riser joints each carrying an identification indicator and a riser joint measurement instrument module, deployable from the vessel to form a riser string. The riser joint measurement instrument modules are each positioned to sense a load imposed on a separate one of the plurality of deployed riser joints. The system also includes a riser joint identification sensor positioned at or adjacent the well bay and operably coupled to the communication network to track riser joint deployment and retrieval, and a riser joint load data receiver connected to the vessel at or adjacent the surface of the sea (e.g., positioned in the well bay, or connected to a riser joint adjacent the surface) and operably coupled to the local shipboard communication network to receive direct or multiplexed load data for each of the plurality of deployed riser joints from the plurality of riser joint measurement instrument modules. The riser joint load data receiver and each of the plurality of riser joint measurement instrument modules establish a communication pathway through a water column associated with the riser string.

The system also includes riser asset management program product stored in the memory of the shipboard computer to monitor and manage a plurality of riser assets. The vessel riser asset management program product can include instructions that when executed by the shipboard computer, cause the shipboard computer to perform various operations including receiving riser joint identification data from the riser joint identification sensor for each of the plurality of riser joints during deployment from the vessel to form the riser string, identifying the respective riser joint being deployed to thereby track the deployment of the riser joint, and determining a relative deployed position location of the each of the plurality of deployed riser joints within the riser string. The vessel riser asset management program product can further include instructions that when executed by the shipboard computer, cause the shipboard computer to perform the operations of receiving riser joint identification data from the riser joint identification sensor for one or more of the plurality of riser joints during retrieval and identifying the respective joint to thereby track the retrieval of the joint.

The vessel riser asset management program product can further include instructions that when executed by the shipboard computer, cause the shipboard computer to perform the operations of receiving the load data for each of the plurality of deployed riser joints from the riser joint data receiver, monitoring loading of each of the plurality of deployed riser joints responsive to the load data provided by the plurality of riser joint measurement instrument modules, estimating a riser joint loading condition for each of the plurality of deployed riser joints responsive to the load data of the one or more of the plurality of deployed riser joints, and providing an alarm responsive to the estimated loading condition nearing an operating design or service envelope.

The system can also include at least one computer to remotely manage riser joints for a plurality of separate vessel locations defining a riser lifecycle management server having a processor and memory coupled to the processor to store operating instructions therein, a global communication network providing a communication pathway between the shipboard computer and the riser lifecycle management server to permit transfer of riser asset information between the shipboard computer and the riser life cycle management server, and riser lifecycle management program product stored in the memory of the riser lifecycle management server to manage a plurality of riser assets positioned at a plurality of separate vessel locations. The riser lifecycle management program product can include instructions that when executed by the riser lifecycle management server, cause the riser lifecycle management server to perform the operations of receiving riser joint deployment and location data for the plurality of deployed riser joints, receiving riser joint load history data for the plurality of deployed riser joints from the shipboard computer, transforming load history data received in the time domain from the shipboard computer into load history data in the frequency domain, and sending riser load history data in the frequency domain to the shipboard computer. The instructions can also include those to perform the operations of determining fatigue of each of the plurality of deployed riser joints responsive to the received riser joint load history data, estimating remaining fatigue life responsive to the received riser joint load history data and riser joint material properties, scheduling routine maintenance events for each of the plurality of deployed riser joints, and scheduling unscheduled maintenance events responsive to a load history anomaly in the riser joint load history data resulting in engagement of a preset fatigue life trigger level requiring inspection. The instructions can further include those to perform the operations of reconstructing a riser string configuration (i.e., performing a virtual construction) of any one of the plurality of riser joints deployed at any one of the plurality of separate vessel locations responsive to the riser joint deployment and location data associated with the respective riser string, and predicting a magnitude of a load imposed on a subsea wellhead system associated with the respective riser string responsive to corresponding riser load history data for at least a subset of a plurality of riser joints forming the respective riser string.

The system can still further include a data warehouse assessable to the processor of the riser lifecycle management server and including at least one database storing asset information, such as, for example, riser joint identification data, riser joint deployment and location data, and riser joint load history data for the plurality of riser joints deployed at the plurality of separate vessel locations, and at least one database accessible to the processor of a shipboard computer and storing asset information, such as, for example, riser joint identification data, riser joint deployment and location data, and riser joint load history data for each of the plurality of riser joints deployed from a respective vessel.

Various embodiments of the present can also include a computer program product, stored on a tangible computer memory medium, operable on a computer to monitor and manage a plurality of marine riser assets positionable at one or more separate vessel locations. The program product can include instructions that when executed by a computer cause the computer to perform various operations including receiving riser joint identification data for each of a plurality of riser joints from a riser joint identification sensor during deployment from a vessel to form a marine riser string, with each riser joint carrying an identification indicator connected thereto, and identifying the respective riser joint being deployed to thereby track the deployment thereof responsive to the riser joint identification data received by the riser joint identification sensor received from a respective identification indicator. The operations can also include receiving riser joint identification data for one or more of the plurality of riser joints from the riser joint identification sensor during retrieval thereof, and identifying the respective one or more riser joints being retrieved to thereby track the retrieval thereof responsive to the riser joint identification data received by the riser joint identification sensor from the respective identification indicator. According to an exemplary configuration, each identification indicator connected to a separate one of the plurality of riser joints carries indicia readable by the riser joint identification sensor to provide information about the respective riser joint sufficient to separately identify each of the plurality of riser joints being deployed and retrieved from each other of the plurality of riser joints during subsea deployment. Correspondingly, the operations can also include tracking the subsea deployment and retrieval of each of the plurality of riser joints.

The computer program product can include instructions represented, for example, by the following computer elements: a riser asset deployment and location tracker adapted to receive subsurface deployment and relative location positioning data for a plurality of riser joints to be deployed to form a marine riser string, a riser asset load sensor data receiver adapted to receive load data for each of the plurality of riser joints when deployed to form the marine riser string, and a riser asset fatigue determiner adapted to estimate a condition of each of the plurality of riser joints responsive to the received riser joint load data and/or riser stress data determined from the received riser joint load data for each separate one of the plurality of riser joints.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

FIG. 2A-B is an environmental view of a portion of the system for monitoring and managing a plurality of marine riser assets according to an embodiment of the present invention;

DETAILED DESCRIPTION

Figure 1:
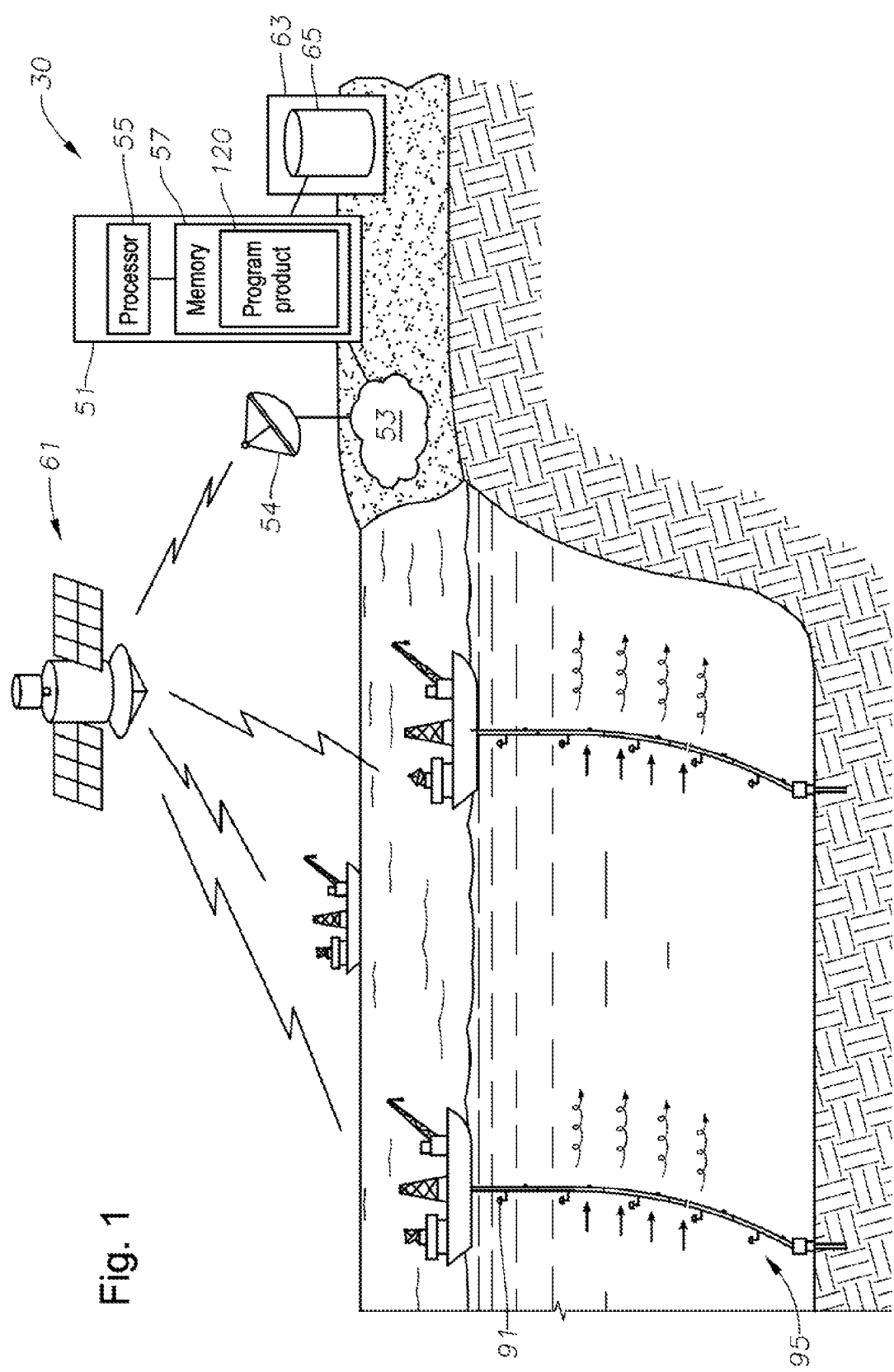
FIG. 1 is an environmental view of a system for monitoring and managing a plurality of marine riser assets according to an embodiment of the present invention.

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art.

FIGS. 1-7 illustrate an embodiment of a Riser Lifecycle Monitoring System (RLMS) which provides an integrated tool designed to improve the lifecycle performance of a marine riser through the application of remote diagnostics, online asset management, and readily accessible riser asset maintenance history, and to permit remote management of riser assets, with particular emphasis on riser joints. The riser lifecycle management system includes integrated hardware and software/program product components which can be combined in a central database preferably located on shore. This database can store asset information on every riser lifecycle management system equipped riser in the world. It also can permit transfer of a riser asset from one vessel to another while retaining all historic data. The vessel computers, in turn, can retrieve the data from sensors placed, for example, on each riser asset. Such riser deployment records can be communicated between the riser asset sensors and the computer on board the ship by means of a simple radio frequency identification or "RFID" tag or other identification indicia on the riser asset and an appropriate receiver on a portion of the vessel such as, for example, the drilling riser spider. As the riser joint or other asset is being run or retrieved, the receiver, for example, on the riser spider, senses the unique riser asset ID tag stored on the RFID chip, and communicates that information to the shipboard computer along with a time stamp. The riser lifecycle management system beneficially provides for acquisition of riser load history data. Such acquisition can include gathering sensor data, multiplexing that data, and communicating it through the water column up to a vessel, while allowing for an acceptable level of fault tolerance. The data acquired depends on the type of sensor used on the riser asset. For example, if only accelerometers are used on the riser joint, then a real time map of the riser accelerations would be available. Additional processing by either the shipboard or shore-based computer, for example, can be performed to convert the information to a real time map of the riser stresses. Alternatively, if strain or riser joint curvature is measured on, for example, a riser joint, then riser joint stress data can be calculated by a relatively simple manipulation of the data. The riser stresses, as a function of time, can then be further manipulated to estimate the condition of the riser joint from an asset operational life standpoint. Such data provided by embodiments of the system can also allow for scheduled and unscheduled maintenance and for control of an associated riser tensioning system.

Figure 2A:
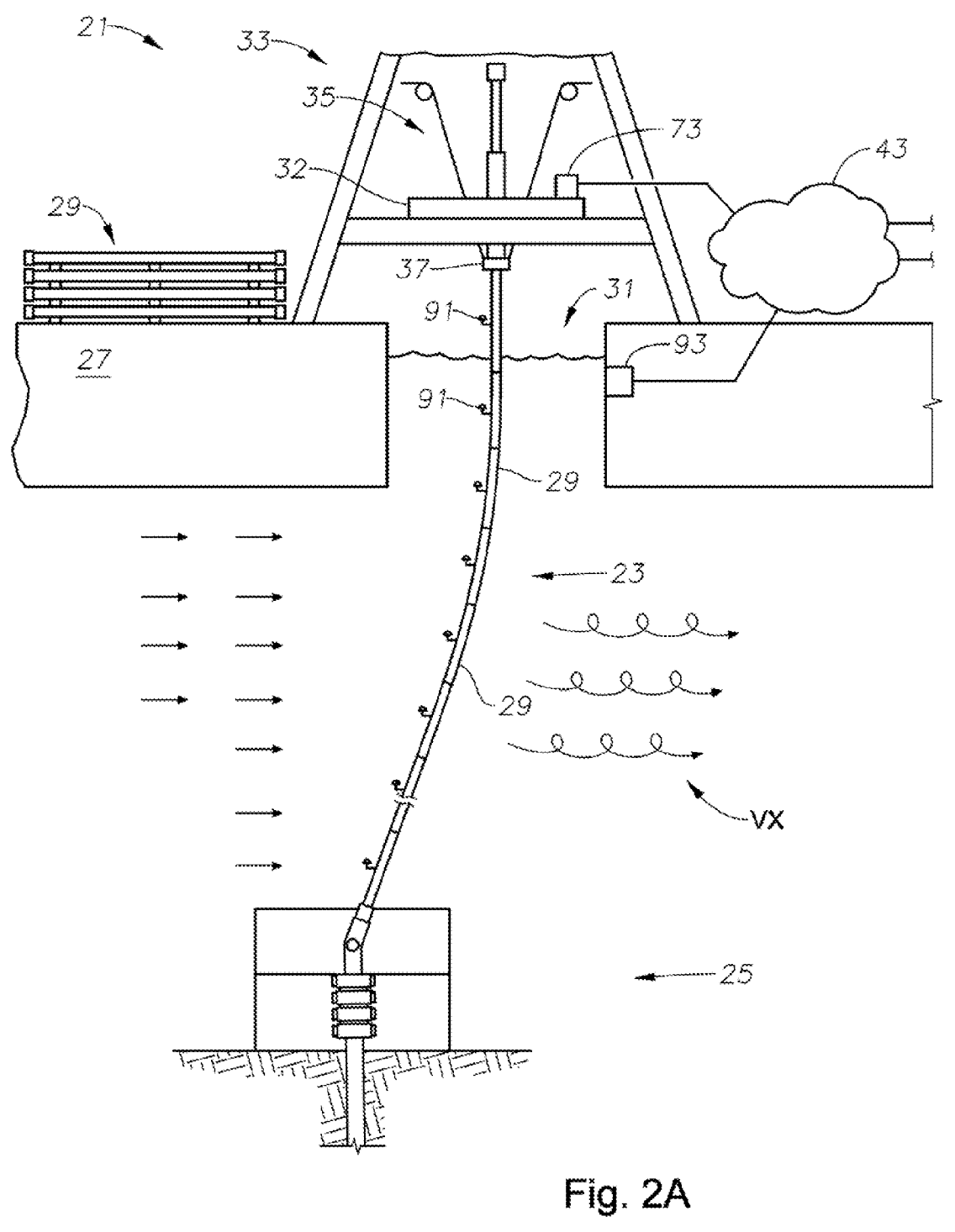
Figure 2B:
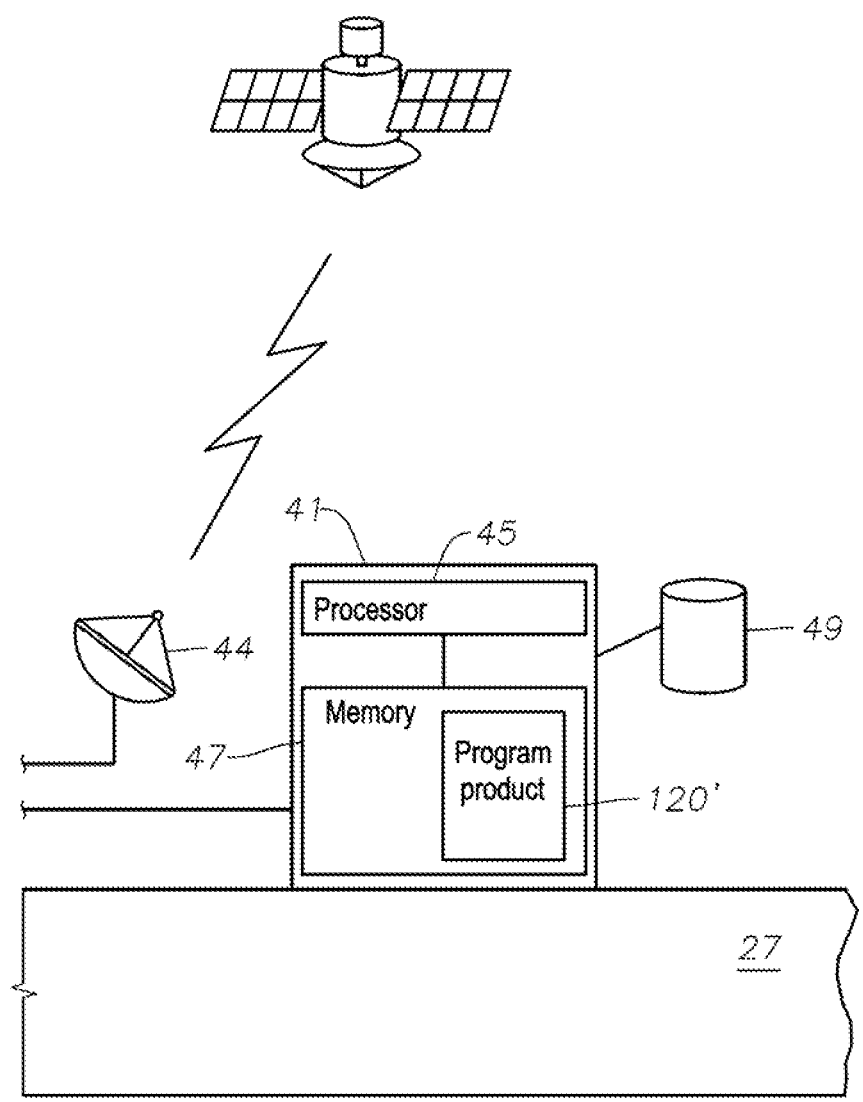
Figure 3:
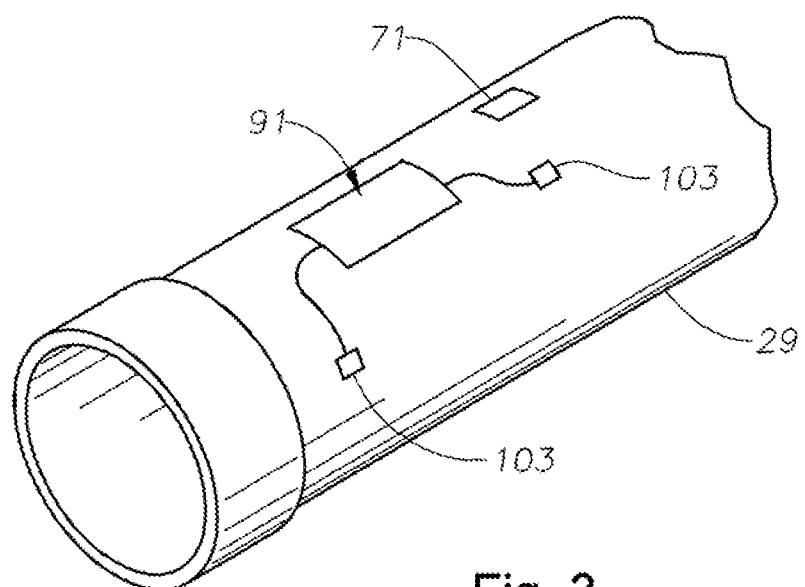
FIG. 3 is a perspective view of a riser joint carrying communication and identification hardware according to an embodiment of the present invention.
Figure 4:
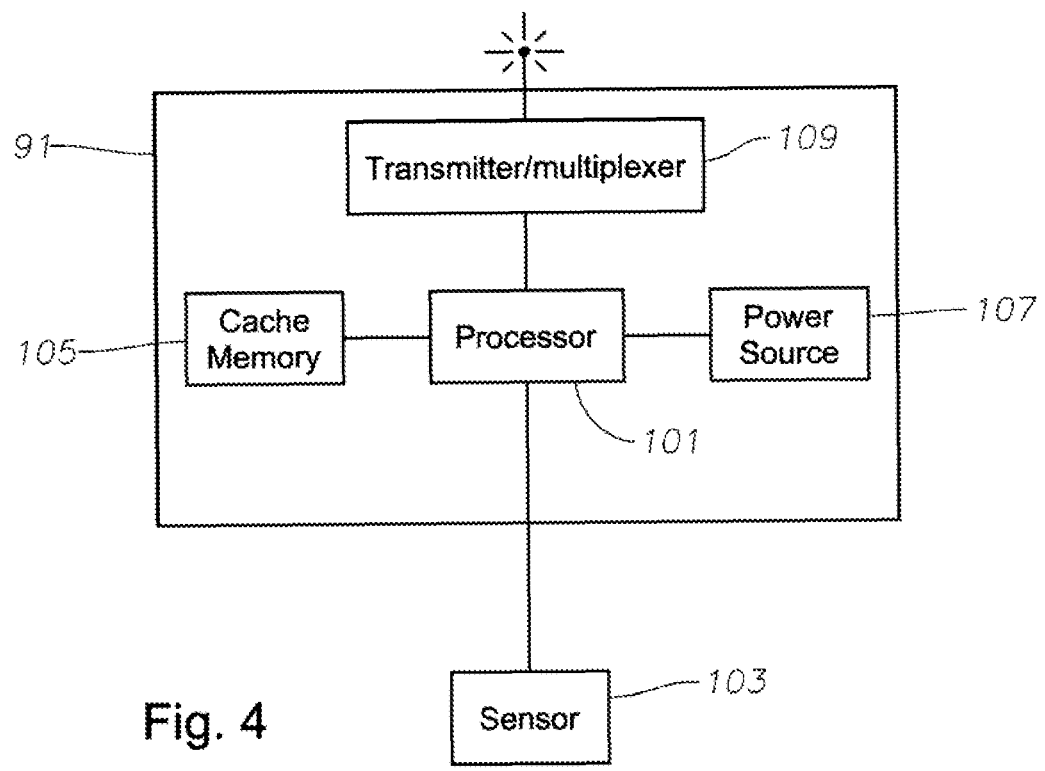
FIG. 4 is a schematic block diagram of a riser joint measurement instrument module according to an embodiment of the present invention.
Figure 5:
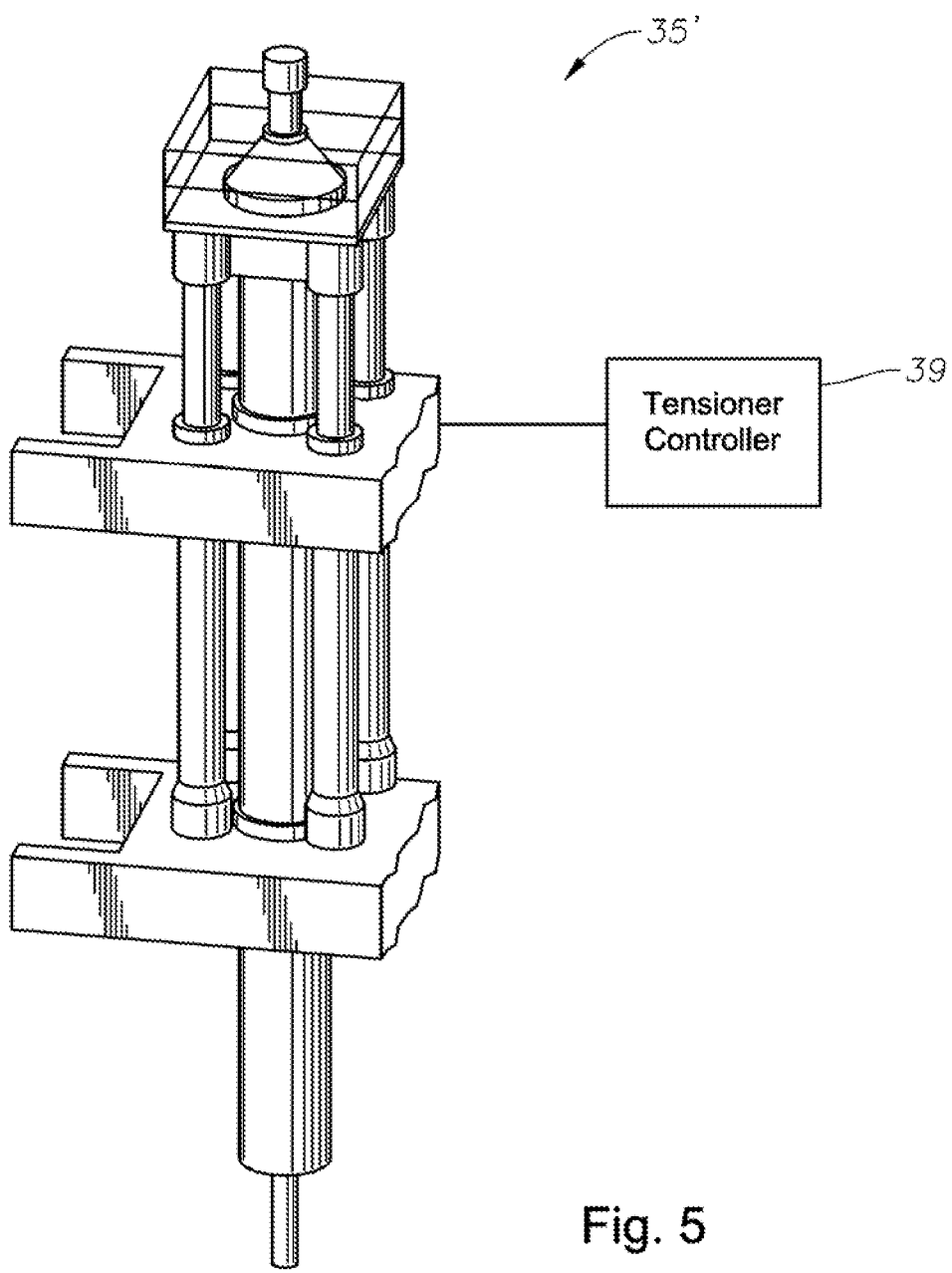
FIG. 5 is a combination perspective view and schematic block diagram of a tensioning system according to an embodiment of the present invention.

More specifically, FIGS. 1-2B illustrate a plurality of offshore drilling and/or production systems 21, and a riser lifecycle management system 30 to remotely manage marine riser assets positioned at one or more separate vessel/drilling/production system locations, according to an embodiment of the present invention. The drilling and/or production system 21 can include a deployed riser pipe or conductor defining a riser string 23 extending between subsea wellhead system 25, such as, for example, the illustrated subsea wellhead, and a floating vessel 27, such as, for example, a dynamically positionable vessel. The riser string 23 includes multiple riser sections or joints 29 connected together, for example, by a bolted flange or other means known to those skilled in the art. The vessel 27 includes a well bay 31 extending through a floor of the vessel 27, and typically includes a spider 32 positioned on an operational platform 33 in a well bay 31 to support the riser string 23 when riser joint connections are being made or broken during running or retrieval of the riser string 23. Note, though embodiments of the present invention apply to both drilling and production risers, the drilling riser was selected for illustration and discussion due to the need for additional components such as, for example, the Lower Marine Riser Package and Blowout Preventer shown within the subsea wellhead system 25, which is not generally required in a production riser.

The vessel 27 also includes a tensioning system 35, 35', located on the operational platform 33 which provides both lateral load resistance and vertical tension, preferably applied to a slip or tensioning ring 37 attached to the top of the riser string 23. The tensioning system 35, 35' includes a riser tensioner controller 39 (FIG. 5) positioned to control tensioning of the riser string 23 when fully deployed. The vessel 27 also includes a shipboard computer 41 in communication with a local shipboard communication network 43, e.g., LAN. The shipboard computer 41 can include a processor 45, and memory 47 coupled to the processor 45. Also in communication with the shipboard communication network 43 is a receiver/transmitter 44 providing, for example, satellite-based communication to onshore facilities. At least one database 49 accessible to the processor 45 of the a shipboard computer 41 is also provided which can be used to store asset information for each of the plurality of riser joints deployed from the vessel 27 can also be provided. As will be described in more detail below, such asset information can include riser joint identification data, riser joint deployment and location data, and riser joint load history data for each of the plurality of riser joints deployed from the vessel 27.

According to an embodiment of the present invention, the riser lifecycle management system 30 includes portions onshore and portions at each of the vessel locations. The portion of the system 30 located at an onshore or other centralized location or locations can include at least one computer to remotely manage riser assets for a plurality of separate vessel locations defining a riser lifecycle management server 51 positioned in communication with an onshore local area communication network 53. The riser lifecycle management server 51 can include a processor 55 and memory 57 coupled to the processor 55. Also in communication with the onshore communication network 53 is a receiver/transmitter 54 providing, for example, satellite-based communication to a plurality of vessels/drilling/production facilities each having a receiver/transmitter 44. This portion of the system 30 can also include a global communication network 61 providing a communication pathway between the shipboard computers 41 of each respective vessel 27 and the riser lifecycle management server 51 to permit transfer of riser asset information between the shipboard computers 41 and the riser life cycle management server 51.

Note, the memory 45, 55, can include volatile and nonvolatile memory known to those skilled in the art including, for example, RAM, ROM, and magnetic or optical disks, just to name a few. It should also be understood that the preferred onshore server and shipboard computer configuration is given by way of example in FIGS. 1 and 2A-B and that other types of servers or computers configured according to various other methodologies known to those skilled in the art can be used. Particularly, the server 51, shown schematically in, for example, FIG. 1 represents a server or server cluster or server farm and is not limited to any individual physical server. The server site may be deployed as a server farm or server cluster managed by a serving hosting provider. The number of servers and their architecture and configuration may be increased based on usage, demand and capacity requirements for the system 30.

At the heart of this portion of the system 30 is a data warehouse 63 which can store relevant data on every piece of riser lifecycle management system equipped riser components anywhere in the world. The data warehouse 63 is assessable to the processor 55 of the riser lifecycle management server 51 and can be implemented in hardware, software, or a combination thereof. The data warehouse 63 can include at least one centralized database 65 configured to store asset information for a plurality of riser joints 29 and other riser assets of interest deployed at a plurality of separate vessel locations. The asset information can include, for example, the part number, serial number, relevant manufacturing records, operational procedures, and all maintenance records (including detailed information on the nature of the maintenance), just to name a few. This information is generally keyed into the system 30 at the time of manufacture or maintenance. The database 65 can also retain deployment and load history information, which is acquired automatically from shipboard computers 41 located on each riser lifecycle management system equipped vessel 27. The shipboard computers 41, in turn, can retrieve the data from one or more identification devices 71 (see, e.g., FIG. 3) preferably placed on each riser joint 29 or other riser or other asset to be tracked.

According to an embodiment of the present invention, the riser identification and deployment data for each riser joint 29 (or other riser asset of interest) is communicated, for example, to the shipboard computer 41 by means of a tag such as, for example, an RFID chip or tag 71 (see, e.g., FIG. 3) positioned on each riser joint 29, and an appropriate riser joint identification sensor or receiver 73 positioned, for example, at or adjacent the well bay 31, preferably on the spider 32, if used, and operably coupled to or otherwise in communication with the shipboard computer 41 through the local shipboard communication network 43. As a riser joint 29, for example, is being run or retrieved, the sensor/receiver 73 on the spider 32 senses the unique riser asset ID stored on the RFID tag 71, and it communicates that information to the shipboard computer 41 along with a time stamp. The shipboard computer 41 then compares ID data with the list of recently recorded tags. If a duplicate asset is reported, it is disregarded. That is, when utilizing automated reading sensors, the same riser asset may be scanned multiple times while being landed on the spider 32 or during the normal course of handling. As such, the preferred handling procedures can include disregarding duplicate records or duplicate reads within a preselected time period. Note, although RFID tags 71 provide certain advantages, other acceptable identification means can include such devices as contact memory buttons, barcodes, or other readable memory devices.

Communication of riser load history data for each deployed riser joint 29 (or other riser asset of interest) is far more complex. As will be described in more detail below, communication of load data for each riser joint 29 can require sensing and multiplexing load data through the water column data, while permitting for an acceptable level of fault tolerance. Various computer program product elements associated with the onshore database 65 and/or the shipboard computer 41 then use the riser load history to monitor the health of the marine riser assets, and make any appropriate recommendations for the timing and the nature of the next maintenance event.

As indicated above, according to an embodiment of the present invention, the database 65 (and/or database 49) can include, e.g., three, basic categories of data: data keyed-in by an operator, data acquired automatically from an on-board sensor or computer, and finally data derived directly by a computer program element from manipulation of stored information. Basic fields of the database 65 and/or 49, according to an embodiment of the present invention, are described below, with respect to database 65.

With respect to keyed-in data, the database 65 can include for each riser asset, a serial number, part number and revision letter, manufacturing records, maintenance records, and operational service procedures. The serial number provides the unique serial number of the particular riser asset. The part number and revision letter provide documentation where a riser asset is revised during its normal life. The manufacturing records can provide critical records typically required during routine maintenance or condition monitoring. For example, material properties and weld types used in fabrication can be employed to determine fatigue life as the riser asset is subjected to operational loads. Conversely, certain manufacturing non-conformances, and their disposition, along with any revision date details, can be of great value during routine maintenance procedures where repairs may be necessary. The maintenance records provide a number of records that are documented during routine or during one-time maintenance of the riser asset. The structure of the maintenance records optimally include references to the reason for maintenance, where, when, and who carried out the work, and any special instructions for future maintenance. The operational service procedures provide documentation of manufacturer's recommended operational procedures. The operational procedures are preferably stored as a separate location and linked to the part number in a manner transparent to the user, to enhance application of updates by the manufacturer.

With respect to automatically acquired data, the database 65 can include for each riser asset, deployment records, and one or more load history tables, along with a tensioner log and/or other vessel data. The deployment records can provide data identifying where and when the particular riser asset was used. As such, a deployment record would reference a particular field, the time stamp when the riser was run, and the time stamp when it was retrieved. Additional deployment information of value, such as the location of the riser asset relative to the water line, can also be stored or automatically determined based on the deployment sequence and the length of each riser joint 29. According to an embodiment of the present invention, the deployment records are transmitted to the database 65 via an RFID tag, which is encapsulated within the riser asset at a particular location. As will be discussed in additional detail below, movement of the RFID tag 71 past an RFID reader/sensor 73 located, for example, on the riser spider 32, would trigger the RFID tag 71 to send a signal to the sensor/receiver 73.

The load history tables can provide a complete picture of the load imposed on the riser asset. The load history tables can include those in the time domain and in the frequency domain. The load history tables provided in the time domain can provide real time riser loading for some user-defined length of time (e.g., 3 months). Load history data older than the defined length of time, or alternatively, a combination of such older data along with the newly data, however, can be, and preferably is retained in the frequency domain, which would span all available riser load history. It is noted that the riser load history in the time domain is used for calculating riser loads in the frequency domain. In addition, the time domain records can be used for extracting extreme magnitudes of riser loads and the particular event they were associated with, and can be used for internal validation of the results derived from the frequency domain data.

The measured time-domain based data can depend on the type of sensor used on the riser asset. For example, if only accelerometers are used on a riser joint 29 to identify individual riser joint loading, then a real time map of the riser accelerations would be provided. Additional processing could then be employed to convert the information to a real time map of the riser stresses. For example, a models database (not shown) can be used to model the loads imposed on each deployed riser joint 29 based on the map of the riser accelerations, and/or determined curvature and/or direction of one or more of the deployed riser joints 29. Alternatively, if strain is measured on the riser joint 29, either through direct or indirect means, riser joint stress data can be calculated by a relatively simple manipulation of the strain data in combination with the previous knowledge of one or more riser asset parameters, such as, for example, riser joint "Stress Amplification Factor" (SAF) in relation to the riser load sensor (measurement instrument) location. Regardless of the type of measurement instrument sensor or module placed on the riser joint 29 or other riser asset, the structure of the database 65 can provide sufficient flexibility for future replacement and upgrade of the measurement instrument sensor or module equipment to that of a different type.

Note, a distinction has been made between time domain based and frequency domain based data. Dynamic data is generally represented in the time domain. For example, a graph showing the height (amplitude) of a wave as a function of time for two years is a simple time history of the wave represented in time domain. This information can also be represented in the frequency domain, generally in a far more compact, but at the cost of loosing some detail. For example, in the instance described above, instead of tracing the height of the wave as a function of time, one can create a table with a hundred rows, each representing a range of wave heights (or more preferably the RMS of the wave heights), and also a period and a probability associated with each wave height and period combination. The more rows in the table, the finer the range of the wave height, and thus, the better the resolution. As can be expected, two years worth of wave height data if represented in time domain at a sampling rate of once a second could result in over 60 million data points, while the same information if represented in frequency domain could result in a table with as few a hundred data points. The frequency domain table, however, generally looses the information associated with wave-to-wave transients. Further, numerical operations on frequency domain data sets are usually significantly more efficient, but at the cost of loosing clarity during transients (in this case, in between two waves) and often requires spot checks with analytical results from the time domain data to ensure accuracy. Frequency domain analyses are, however, accurate and adequate in most cases, and in particular for evaluation of fatigue, according to an embodiment of the present invention.

The tensioner log can provide storage of various parameters such as, for example, tension setting, applied tension, and tensioner stroke, which can be used alone or in conjunction with the riser joint load history data to determine various settings necessary to adjust riser joint loading and to formulate control signals to perform real-time adjustments, described in more detail later.

With respect to computed data, the database 65 can include for each riser asset, a riser asset Stress Amplification Factor (SAF) table, the load history table in the frequency domain, a maximum amplitude matrix, and estimated fatigue life remaining. The riser asset SAF table can provide a compact table that lists the critical locations (positions) on the riser asset where the fatigue computations should take place, such as at the location of the connecting flanges. The SAF table can also provide the SAF, itself, for each respective location, along with the SAF reference information (e.g., nominal pipe OD and wall thickness).

The frequency domain-based load history table, as noted previously, can provide the operator with a comprehensive map of the loads imposed on each specific riser joint 29, and ultimately, loads imposed on the entire riser string 23. The frequency domain-based load history table can be used to evaluate, for example, the total fatigue damage imparted on the riser asset. This information can be computed by the transformation of a large volume of time domain-based riser load history into a relatively compact table in the frequency domain. A computer program element can perform the transformation and can update the table on regular intervals (e.g., once a day, or on the fly in response to a query, etc.). Regardless of the type of data gathered by the loading measurement instrument sensors/modules (e.g., accelerations, strain, curvature, etc.) on the riser asset, the frequency domain table can be manipulated to contain only certain quantities that are of particular interest (e.g., strains or stresses). In other words, two transformations may take place at the same time in order to prepare the final table in frequency domain, the data conversion (calculating or modeling) to produce a quantity of interest, and a data conversion from the time domain to the frequency domain.

The maximum amplitude matrix can provide maximum amplitude values of one or more parameters of interest. As the volume of data stored is relatively small, the maximum amplitude figures can be retained for each riser asset for each drilling/completion operation, referencing the name of the field and also the well.

The riser lifecycle management system 30 also includes various shipboard and riser carried components. For example, shipboard computer 41, along with shipboard communication network 43, database 49, RFID tags 71, and riser joint identification sensor or receiver 73, have already been identified. Further, the system 30 can also include riser joint measurement instrument modules 91 each positioned to sense a load represented by strain, riser pipe curve, or accelerometer data, etc. imposed on a separate one of the riser joints 29 forming the riser string 23, a riser joint load data receiver 93 mounted or otherwise connected to the vessel 27 at or adjacent the surface of the sea and operably coupled to the local shipboard communication network 43 to receive load data for each of the deployed riser joints 29 from the riser joint measurement instrument modules 91, and a subsurface communication medium 95 illustrated as provided via a series of ROV replaceable wireless data telemetry stations providing a communication pathway between each of the joint measurement instrument modules 91 and the riser joint load data receiver 93 through a water column associated with the riser string 23. As perhaps been shown in FIGS. 3 and 4, each instrument module 91 (e.g., data telemetry station) can include a processor 101 in communication with at least one sensor element 103, cache memory 105 to store collected load data, a power source 107 preferably including a battery or other energy storage device, and a data transmitter/multiplexer 109 for providing both collected and received loading data to the riser joint load data receiver 93, either directly, or via another one or more of the other instrument modules 91. A more detailed discussion follows later which includes a discussion of other configurations:

The measurement instrument modules 91 can determine the magnitude of the loads imposed on the riser string 23 to calculate the magnitude of the stress at various locations on the riser joint 29 or other riser asset. There are a number of methods under which the riser stresses can be measured. A preferred option is one that reads the riser pipe strain at the sensor 103, since conversion of strain data to stresses is fairly straightforward and can be done via a relatively simple computer program element. Alternatively, the riser dynamics can be obtained via accelerometers, which may require a more complex set of operations for conversion to material stress from which the operational (e.g., fatigue) life can then be calculated. Other measurement options are, however, within the scope of the present invention. In either case, the load data sent to the riser lifecycle management server 51 can be in either raw data or converted to local stresses by the shipboard computer 41, or some intermediate form if some processing is accomplished by the instrument modules 91.

According to an embodiment of the present invention, the sensor 103 is carried by a thin clamp-on composite mat (not shown), which can be used to accurately determine the deflection in the riser joint 29. In such configuration, the mat is preferably about 3 feet long and covers approximately 170 degrees of the circumference of the riser joint 29. Each mat contains optical fibers connected to an electronic sensor 103 that is tuned to measure the wavelength of the light in the fibers. As the stiffness of the composite mat is substantially lower than the material forming the riser joint 29, the mat assumes the same curvature as the riser joint 29 to which it is connected, thus changing the length of the fiber optic wires embedded in the mat and the measured wavelength. As noted above, various other methodologies of positioning or carrying sensor 103 as known to those skilled in the art are within the scope of the present invention.

In a preferred configuration, the instrument readings taken by each measurement instrument module 91 are transmitted from one riser joint 29 or other asset to the next, multiplexed with the current riser instrument readings, and forwarded until it reaches the vessel mounted receiver 93. This receiver 93, in turn, sends the full data stream to the shipboard computer 41 for processing and communication back to the riser lifecycle management server 51 and onshore database 65. While data multiplexing is a well understood concept, communication though the water column introduces specific challenges. Various options for data telemetry are hardwire, acoustics, electromagnetics, and laser telemetry.

Hardwire transmission media is probably the most straightforward method for communication of a large amount of data. The hardwire option, however, has some significant disadvantages. Among others, a damaged wire, especially near the top of the riser string 23, could result is total loss of data from a significant majority of the riser joint 29 or other assets. Also, a hardwire option would typically require watertight stabs at each riser joint 29. When running and retrieving the riser string 23, these stabs are subject to a somewhat hazardous environment in terms "abuse" and contaminants, which are ever present in riser operations. The hardwire option might be more practical as a jumper between two adjacent riser joints 29, but ideally only as a short-term solution when the primary riser data telemetry has failed. Such an option would, nevertheless, typically require some level of ROV intervention.

Acoustics is probably the most established form of communication for underwater data telemetry. Acoustics offers a number of advantages and some disadvantages, both of which are well-understood. At very short ranges (about 200 feet), a data rate of 500 kbps is achievable while operating at a carrier frequency of ~1 MHz. This bandwidth is in excess of that required for telemetry over a range that spans two riser joints 29 or other riser assets. According to an embodiment of the system implementing acoustics, each riser asset is equipped with a transceiver that receives data, ignores the part not addressed to it, multiplexes the incoming data with its own sensor readings, codes it with its identification, and then transmits the combined data packet to the next riser asset, which uses the same routine to add more data and pass it on. According to a preferred configuration, each riser asset is initially programmed to only communicate with the riser assets located immediately above and below it having a measurement instrument module 91; ignoring the data intended for any other riser asset. This sequencing is carried out during riser deployment. In the event that a data telemetry system on a riser asset malfunctions, a signal from the surface, for example, is sent which traverses all instrument module equipped riser assets and carries out a re-sequencing of the transceivers so that the malfunctioning riser asset is removed from the chain. Alternatively, the instrument module 91 above the malfunctioning instrument module 91, for example, can include stored instructions such that after failing to detect any signal from its adjacent instrument module 91, such module begins listening to the next nearest most instrument module 91.

As with other non-hardwired telemetry options, when implementing acoustics, battery life management is key to ensuring a sufficiently long operating time. In order to be robust, sufficient battery life, e.g., for at least six months, can be readily allocated on each riser asset in order for it to meet the demands of its various subsystems throughout the drilling/completion campaign. The use of seawater batteries, as an alternative power source, can help compensate for such limitation. Additionally, the instrument modules 91 can be programmed to provide periodic transmission of data, for example, once every 30 seconds or longer, so that the transceivers 109 are in the listen mode for a majority of the time. Further, the instrument modules 91 can be provided sufficient memory 105, not only to store data for the periodic transmissions, but to store data for a preselected period of time in the event data communication is disrupted while remedial action is being carried out. According to another embodiment of the present invention, the acoustics system provides multiband transmission to both compensate for single band signal disruption, when occurring, and to increase transmission bandwidth.

Electromagnetic or EM (radio) communications can be implemented, although they are not widely used for underwater applications. A fundamental problem with EM is the difficulties encountered with providing data communication through the conductive seawater, which has traditionally required relatively long antennas and high power. EM communication offers a significant advantage with respect to installation, but at the expense of providing a relatively limited range. For example, a range of 180 feet limits the communication baud rate to double digits, and broadband communication is typically limited in transmission range to a few inches at best. One of the most significant advantages of using EM, however, is its ability to provide a practical alternative to hardwire. In such case, each measurement instrument module 91 can contain a sealed EM transceiver adjacent each riser joint connector, preferably located so that they are in close proximity of each other transceiver when the riser joints 29 are connected, thus enabling broadband communication. Data between riser connectors of each single riser joint 29 is then communicated via hardwire. The sensor 103 and remaining hardware can advantageously be located somewhere (as desired) along the length of the riser joint 29, directly connected to the aforementioned hardwire line. Additionally, such EM communications technology can be augmented with laser or acoustic communications, to provide an overall more robust data telemetry scheme.

Laser telemetry (optical wave) technology can further be utilized. Although laser telemetry requires more pointing precision than acoustics, laser telemetry is readily achievable, especially when implemented on the relatively straight riser joints 29. Optical waves, however, are affected by scattering.

Regardless of which communication medium or media 95 are utilized, a preselected level of fault tolerance must be achieved. It should be assumed that components of the measurement instrument modules 91 on each riser asset may malfunction from time to time. This malfunctioning, however, may not be a direct cause of the electronics, but may be associated with the harsh environment/handling that the equipment is subjected to during operation or deployment. Embodiments of the subsurface communication medium or media 95, nevertheless, must operate when the electronics on one or more riser assets are not in operation. The fault tolerant options selected are a function of the environment, the type of riser system, and the desired operational performance. A few example of fault tolerance data telemetry options are: use of riser asset re-sequencing, use of variable power, use of hardwired jumpers, use of ROV replaceable data telemetry stations, and use of enhanced onboard RAM.

As noted previously, the riser asset re-sequencing option prescribes a fault tolerance methodology whereby data is transmitted to cover a span of more than one riser asset, and whereby each measurement instrument module 91 acts on the data intended for it, and ignores the rest. In the case of a fault in a riser joint 29 or other riser asset of the riser string 23 carrying a measurement instrument module 91, a signal from the surface can be provided to re-sequence the transceivers 109 to bypass the malfunctioning module 91. This is possible because the range of the signal of the instrument modules 91 can be given to cover two or more riser assets.

The variable power option prescribes a fault tolerance methodology whereby, in the context of acoustics, for example, the instrument module 91 would tune the transceiver 109 so that it would normally only communicate with the station directly above or below it. In the case of a fault, a surface signal would be provided which would instruct each measurement instrument module 91 to broadcast at higher power, reporting at least the two nearest stations. Such a scheme, among others, can be used to determine the location of the fault, and instruct the functioning instrument modules 91 just above and below the faulty instrument module 91 to operate at higher power, returning the remaining modules 91 to the normal power consumption mode.

The hardwire jumper fault tolerance methodology prescribes a remedial option that would require ROV intervention. In this scenario, a malfunctioning measurement instrument module 91 can be accessed by hardwire jumpers between it and the stations directly above and below.

The ROV replaceable data telemetry station option prescribes a fault tolerance methodology similar to that of the hardwire option, except the entire hardware package, usually less the sensor 103 and associated delivery/installation equipment, is easily replaced using an ROV.

The on-board RAM option prescribes a fault methodology whereby some amount of excess on-board RAM or other memory 105 would be provided in order to store data in the event the data telemetry portion of the instrument module 91 is not functioning, while the sensor 103 continues to gather data. The amount of memory 105 is a linear function of the amount of time expected for remedial action. A very robust system would include one that can locally store several months of sensor data, as well as several days of sensor data from the riser asset directly below. This clearly depends on the amount and volume of information the operator wishes to have gathered by the sensors 103 and the packaging cost of the onboard memory 105.

While a few options for fault tolerance were described above, it should be noted that various other fault tolerance options can be incorporated in all subsystems. This can include ship-to-shore data integrity checks as well as database availability at a redundant data center.

Regardless of the subsurface communication medium or media, according to an embodiment of the present invention, the shipboard computer 41 receives the various sensor data, sorts it, adds additional information (i.e., field name, well number, and other relevant information), and forwards it to the shore-based data warehouse 63 via a communication network such as, for example, global communication network 61. As a backup, the shipboard computer 41 maintains the entire history for the particular well over which the drilling/completion/production operation, etc. is taking place.

According to the illustrated embodiment of the system, the shipboard computer 41 on regular intervals, receives the latest riser asset load history for each of its riser assets in the frequency domain from the data warehouse 63. The shipboard computer 41 also performs routine monitoring of the condition of the various assets, for example, several times a minute.

The shipboard computer 41 can advantageously provide a primary alarm system for when either an anomaly is detected directly from an instrument module 91, or when the accelerated fatigue damage is predicted. Examples of an anomaly in the sensed data would be excessive stresses, deflections, accelerations, etc. Built-in routines provided by computer program elements, described in detail below, can determine the source of the anomaly, and alarm the operator as to the possible root cause. For example, vortex induced vibration ("VIV") caused by shedding of vortices VX may be reported on a 300' section of the riser some 500' below the water line if it is experiencing high frequency alternating stresses in a cross flow motion. In such an event, the shipboard computer 41 may perform additional monitoring of the excited riser joint 29 or section, and predict the condition of the riser joint 29 or section several days, weeks, or months in advance. It is noted that, according to an embodiment of the present invention, the onshore riser lifecycle management server 51 includes computer program elements to perform a more comprehensive health monitoring checks, but at the expense of a time lag in reporting the results. Further, having detected such an event, the shipboard computer 41, through the shipboard communication network 43 can provide commands to a tensioner controller 39 (FIG. 5) to provide control of the tensioning system 35, 35', to reduce or mitigate the effect of the VIV.

Figure 6:
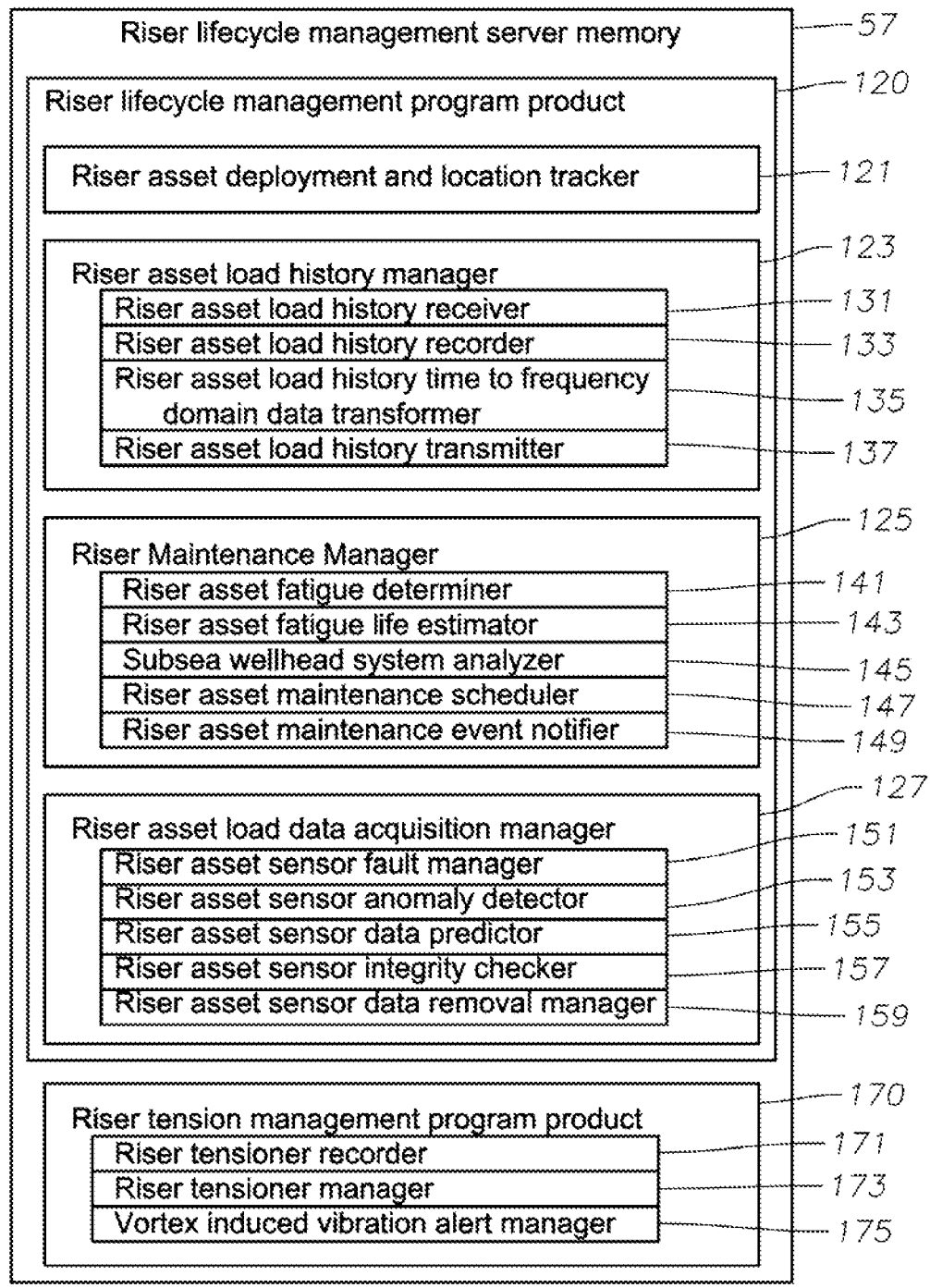
FIG. 6 is a schematic block diagram of a riser lifecycle management program product stored in the memory of a riser lifecycle management server according to an embodiment of the present invention.
Figure 7:
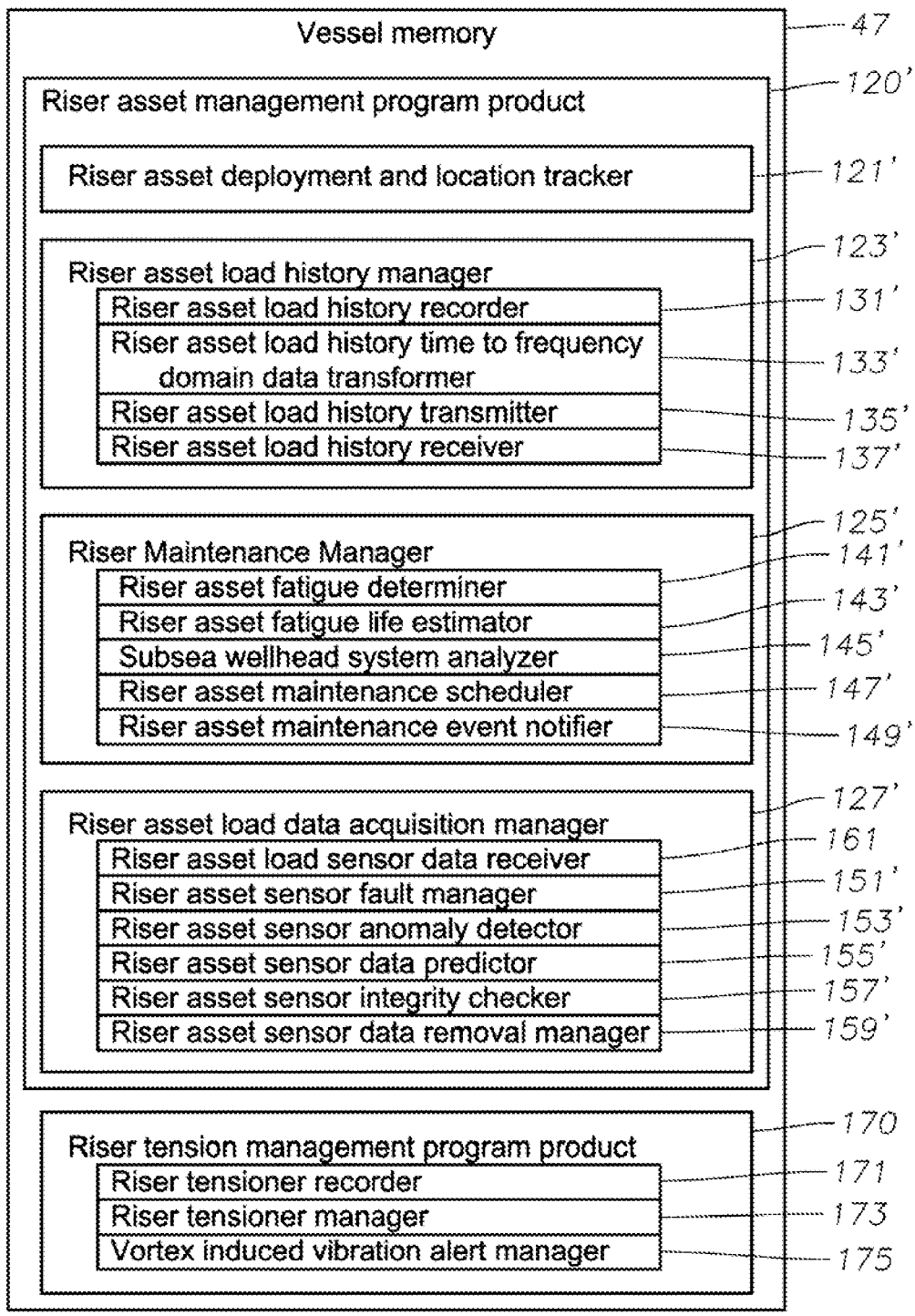
FIG. 7 is a schematic block diagram of a riser asset management program product stored in the memory of a shipboard computer according to an embodiment of the present invention.

As perhaps best shown in FIGS. 6 and 7, embodiments of the present invention include riser lifecycle management program product 120 stored in the memory 57 of the riser lifecycle management server 55 to monitor and manage a plurality of riser assets including riser joint 29 positioned at a plurality of separate vessel locations (e.g., on or deployed by each vessel 27). Similarly, embodiments of the present invention include riser asset management program product 120' stored in the memory 47 of the shipboard computer 41 to monitor and manage a plurality of riser assets including riser joint 29 assigned to the specific vessel 27. As most of the computer program elements executed by the shipboard computers 41 and the riser lifecycle management server 51 are very similar in function, the computer program elements will primarily be described with respect to those either solely or jointly executed by the riser lifecycle management server 51.

Note, the riser lifecycle management program product 120 and the riser asset management program product 120', can be in the form of microcode, programs, routines, and symbolic languages that provide a specific set or sets of ordered operations that control the functioning of the hardware and direct its operation, as known and understood by those skilled in the art. Note also, neither the riser lifecycle management program product 120 nor the riser asset management program product 120', according to an embodiment of the present invention, need to reside in its entirety in volatile memory, but can be selectively loaded, as necessary, according to various methodologies as known and understood by those skilled in the art. Further, the riser lifecycle management program product 120 and riser asset management program product 120' each include various functional elements as will be described in detail below, which have been grouped and named for clarity only. One skilled in the art would understand that the various functional elements need not be physically implemented in any hierarchy, but can be readily implemented as separate objects or macros. Various other conventions can be utilized as well, as would be known and understood by one skilled in the art. Further note, although the following functional element description is directed primarily to riser joint 29, one skilled in the art would recognize that such functionality can encompass other riser assets of interest.

According to an embodiment of the present invention, the riser lifecycle management program product 120 can include a riser asset deployment and location tracker 121, a riser asset load history manager 123, a riser maintenance manager 125, and a riser asset load data acquisition manager 127, that when executed by the riser lifecycle management server 51 cause the server 51 to perform various operations, described below. The riser asset deployment and location tracker 121 can function to receive subsurface deployment and relative location positioning data for a plurality of riser joints 23 adapted to be deployed to form various marine riser strings 23 associated with the plurality of vessels 27.

The riser load history manager 123 manages and manipulates the load history. According to an embodiment of the present invention, the riser load history manager 123 includes a riser asset load history receiver 131, a riser asset load history recorder 133, a riser asset load history time to frequency domain data transformer 135, and a riser asset load history transmitter 137. The riser asset load history receiver 131 can function to receive load history data for each of the riser joints 29 or other riser assets from each vessel 27 and to store the load history in a database such as, for example, database 65. The riser asset load history recorder 133 can function to form and store a time-domain based load history table which, as described previously, can provide real-time riser loading imposed on each of the riser joints 29 or other assets for each vessel 27 or other facilities for a preselected length of time, and can function to store maximum amplitudes for one or more parameters of interest for each of the riser joints 29 or other riser assets, for example, in the form of a maximum amplitudes matrix, as described previously. The riser asset load history time to frequency domain data transformer 135 can function to transform time-domain based load history data into a frequency domain and to provide a frequency-domain based load history table, as described previously, to thereby provide storage for substantially all available riser joint load history for each of the riser joints 29 or other riser assets, in order to reduce storage requirements and to reduce an amount of computing time necessary to analyze the data. The riser asset load history transmitter 137 can function to send the frequency-domain based riser joint load history for a subset of the riser joints 29 or other riser assets forming an associated deployed riser string 23, to a shipboard computer 41 carried by the vessel 27 deploying the subset of the plurality of riser joints 29 or other riser assets. This can be accomplished over a communication network, such as, for example, global communication network 61.

The riser maintenance manager 125 manages determining and scheduling maintenance requirements. The riser maintenance manager 125 can include a riser asset fatigue determiner 141, a riser asset fatigue life estimator 143, a subsea wellhead system analyzer 145, riser asset maintenance scheduler 147, and a riser asset maintenance event notifier 149. The riser asset fatigue determiner 141 can function to estimate a condition of each of the riser joints 29 and other riser assets of interest from the riser joint load data received from the shipboard computers 41 or riser stress data (as a function of time) either received from the shipboard computers 41 or determined from the received riser joint load data by the server 51, or a combination thereof, for each riser joint 29 or other riser asset of interest across the spectrum of vessels and facilities in communication with the riser lifecycle management server 51. The riser asset fatigue life estimator 143 can function to estimate remaining fatigue life for each of the riser joints 29 or other riser asset of interest from the received load data, stored load history data, and specific riser asset material properties data for each respective riser asset, or a combination thereof, and to issue an alert when the fatigue life of a respective riser asset drops below a preset fatigue life trigger level requiring inspection. The subsea wellhead system analyzer 145 can function to predict a magnitude of load imposed on a subsea wellhead system 25 based upon riser load history data for a subset of the riser joints 29 and/or forming an associated marine riser string 23. The riser asset maintenance scheduler 147 can function to generate a schedule of routine maintenance events for each riser joints 29 or other riser asset of interest, based upon the received load data, the stored load history, and respective riser asset material properties, or a combination thereof, and to generate unscheduled maintenance events responsive to a load data anomaly when occurring detected in the received load data and resulting in engagement of a preset fatigue life trigger level requiring inspection. The riser asset maintenance event notifier 149 can function to issue an online alert providing a reminder to a user of a forthcoming scheduled maintenance event, and can function to issue an online alert indicating an unscheduled maintenance event requirement when existing.

The riser asset load data acquisition manager 127 manages and reviews the qualities of the acquired riser asset load data. According to an embodiment of the present invention, the riser asset load data acquisition manager 127 includes a riser asset sensor fault manager 151, a riser asset sensor anomaly detector 153, a riser asset sensor data predictor 155, a riser asset sensor integrity checker 157, and a riser asset sensor data removal manager 159. The riser asset sensor fault manager 151 can function to identify a malfunctioning riser joint measurement instrument module 91 associated with one or more of the plurality of deployed riser joints forming the marine riser string 23, and to signal one or more adjacent riser joint measurement instrument modules 91 to bypass the malfunctioning riser joint measurement instrument module 91 or to otherwise implement one or more of the previously fault tolerance methodologies described previously, to thereby provide substantially continuous load data acquisition for each riser joint measurement instrument module 91 positioned below the malfunctioning riser joint measurement instrument module 91. Note, as will be understand by one skilled in the art, the type of fault methodology implemented is dependent upon the type of communication media utilized, the type of sensors associated with the instrument modules 91, and the spacing of the modules 91 which may or may not be positioned on each riser joint 29 forming the riser string 23.

The riser asset sensor anomaly detector 153 can function to detect a load data anomaly when occurring responsive to the received load/load history data. The riser asset sensor data predictor 155 can function to generate predicted sensor data that a riser joint measurement instrument module 91 associated with one or more deployed riser joints 29 or other riser assets of interest, should report based on recent load history for the respective instrument module 91 and/or those provided by other adjacent instrument modules 91 deployed on the same riser string 23. The riser asset sensor integrity checker 157 can function to compare sensor readings of a riser joint measurement instrument module 91 associated with one or more deployed riser joints 29 or other riser assets forming a same deployed riser string 23 to sensor readings for at least two adjacent riser joints 29 or other riser assets forming the riser string 23 to thereby determine an integrity of the riser joint measurement instrument module 91, and to flag sensor readings emanating from the respective instrument module 91 when the integrity is determined to be questionable. The riser asset sensor data removal manager 159 can function to remove flagged data associated with a faulty sensor from active record data, and to optionally replace the removed data with corresponding predicted data generated by the riser sensor data predictor 155.

Beneficially the functionality provided by the riser lifecycle management program products 120 provides asset managers real-time and stored database information to maintain the various riser assets of interest. As an example, according to an embodiment of the present invention, when a user logs into the system, the user would see the various vessels 27 equipped according to embodiment of the present invention and associated with the user, along with graphical user interface fields which allow the user to query such data by vessel, riser asset, or field. The vessel query can beneficially provide the user a list all the riser assets allocated to the vessel and provide a further breakdown of those riser assets that are currently deployed, are on deck, or are out for maintenance, along with the expected return date. This view of the data can also be used to generate a list of upcoming scheduled maintenance events. The riser asset query can beneficially provide the user with an estimate of the operational life used by a particular riser asset, along with the details of the most damaging events (i.e., a certain hurricane event). This query can also provide detailed information on riser maintenance history and critical/relevant manufacturing information. Individual riser assets can potentially be moved from one vessel 27 to another with their history intact. The field query can provide the user with information to reconstruct a riser string configuration of any particular deployment. The availability of the time stamp for each riser deployment permits determination of where, in the water column, each riser asset was located for any particular drilling campaign. This information can also be used to automatically create input for a riser analysis program.

As noted above, the vessel riser asset management program products 120' can generally include much of the functionality provided by the riser lifecycle management program products 120, but preferably at a local vessel level, rather than at an operational program, fleet, or enterprise level. Accordingly, the vessel riser management program product 120' can include a riser asset deployment and location tracker 121', a riser asset load history manager 123', a riser maintenance manager 125', and a riser asset load data acquisition manager 127', that when executed by the respective shipboard computer 41, cause the computer 41 to perform various operations, described below.

The riser asset deployment and location tracker 121' can function to receive subsurface deployment and relative location positioning data for a plurality of riser joints 23 adapted to be deployed to form a marine riser string 23 associated with the respective vessel 27.

The riser load history manager 123' manages and manipulates the load history for the riser joint 29 or other assets of interest associated with the respective vessel 27. Although much of the functionality is preferably implemented by the riser lifecycle management server 51, according to an embodiment of the present invention, the riser load history manager 123' nevertheless is provided and correspondingly includes a riser asset load history receiver 131', a riser asset load history recorder 133', a riser asset load history time to frequency domain data transformer 135', and a riser asset load history transmitter 137', to at least partially perform functions performed by the riser lifecycle management server 51.

According to an embodiment of the present invention, the riser asset load history receiver 131' can function to receive load history data for each of the of riser joints 29 or other riser assets from the riser lifecycle management server 51 and to store the load history in a database such as, for example, database 49. Such data is typically frequency-domain based data. According to an embodiment of the present invention, a riser asset load history time to frequency domain data transformer 135' can function to also, or alternatively, independently transform time-domain based load history data into a frequency domain and to provide a frequency-domain based load history table, as described previously, to thereby provide storage for substantially all available riser joint load history for each of the riser joints 29 or other riser asset of interest associated with the deployed riser string 23 for the respective vessel 27, in order to reduce storage requirements and to reduce an amount of computing time necessary to analyze the data. The riser asset load history recorder 133' can function to form and store a time-domain based load history table which, as described previously, can provide real-time riser loading imposed on each of the riser joints 29 or other assets for each vessel 27 or other facilities for a preselected length of time, and can function to store maximum amplitudes for one or more parameters of interest for each of the riser joints 29 or other riser assets, for example, in the form of a maximum amplitudes matrix, as described previously. The riser asset load history transmitter 137' can function to send either raw data, time-domain based data, or the frequency-domain based riser joint load history for the riser joints 29 or other riser assets of interest forming an associated deployed riser string 23, to the riser lifecycle management server 51 over a communication network, such as, for example, global communication network 61.

The riser maintenance manager 125', similar to that for the riser lifecycle management program products 120, can manage determining and scheduling maintenance requirements for riser joints 29 or other riser assets of interest, particularly those associated with the specific vessel 27. The riser maintenance manager 125' can include a riser asset fatigue determiner 141', a riser asset fatigue life estimator 143', a subsea wellhead system analyzer 145', riser asset maintenance scheduler 147', and a riser asset maintenance event notifier 149'. The riser asset fatigue determiner 141' can function to estimate a condition of each of the riser joints 29 and other riser assets of interest from the riser joint load data, e.g., riser stress data (as a function of time) either received from the measurement instrument modules 91 or determined from the data received from the measurement instrument modules 91, stored riser asset load history data, and riser asset material properties, or a combination thereof, for each riser joint 29 or other riser asset of interest generally for the specific vessel 27 or facility.

The riser asset fatigue life estimator 143' is similarly adapted to estimate remaining fatigue life for each of the riser joints 29 or other riser asset of interest from the received load data, stored load history data, and specific riser asset material properties data for each respective riser asset, or a combination thereof, and to issue an alert when the fatigue life of a respective riser asset drops below a preset fatigue life trigger level requiring inspection. The subsea wellhead system analyzer 145' is further similarly adapted to predict a magnitude of load imposed on a subsea wellhead system 25 based upon the received load data and/or stored load history data associated with the deployed riser joints 29 or other riser assets of interest forming the respective marine riser string 23.

The riser asset maintenance scheduler 147' can function to generate a schedule of routine maintenance events for each riser joints 29 or other riser asset of interest, based upon the received load data, the stored load history, and respective riser asset material properties, or a combination thereof, and to generate unscheduled maintenance events responsive to a load data anomaly when occurring detected in the received load data and resulting in engagement of a preset fatigue life trigger level requiring inspection. The riser asset maintenance event notifier 149' can function to issue an online alert providing a reminder to a user of a forthcoming scheduled maintenance event, and can function to issue an online alert indicating an unscheduled maintenance event requirement when existing.

The riser asset load data acquisition manager 127' manages and reviews the qualities of the acquired riser asset load data. According to an embodiment of the present invention, the riser asset load data acquisition manager 127' includes a riser asset sensor fault manager 151', a riser asset sensor anomaly detector 153', a riser asset sensor data predictor 155', a riser asset sensor integrity checker 157', a riser asset sensor data removal manager 159', and a riser asset load sensor data receiver 161.

The riser asset load sensor data receiver 161 can function to receive load data collected from the measurement instrument modules 91 when the riser joints 29 or other riser assets of interest are deployed in place to form the riser string 23 and/or during deployment. The riser asset sensor fault manager 151' can function to identify a malfunctioning riser joint measurement instrument module 91 associated with one or more of the plurality of deployed riser joints forming the marine riser string 23, and to signal one or more adjacent riser joint measurement instrument modules 91 to bypass the malfunctioning riser joint measurement instrument module 91 or to otherwise implement one or more of the previously fault tolerance methodologies described previously, to thereby provide substantially continuous load data acquisition for each riser joint measurement instrument module 91 positioned below the malfunctioning riser joint measurement instrument module 91.

The riser asset sensor anomaly detector 153' can function to detect a load data anomaly when occurring responsive to the received load data. The riser asset sensor data predictor 155' can function to generate predicted sensor data that each riser joint measurement instrument module 91 associated with one or more deployed riser joints 29 or other riser assets of interest, should report based on recent load history for the respective instrument module 91 and/or those provided by other instrument modules 91 deployed on the same riser string 23. The riser asset sensor integrity checker 157' can function to compare sensor readings of a riser joint measurement instrument module 91 associated with one or more deployed riser joints 29 or other riser assets forming a same deployed riser string 23 to sensor readings for at least two adjacent riser joints 29 or other riser assets forming the riser string 23 to thereby determine an integrity of the riser joint measurement instrument module 91, and to flag sensor readings emanating from the respective instrument module 91 when the integrity is determined to be questionable. The riser asset sensor data removal manager 159' can function to remove flagged data associated with a faulty sensor from active record data, and to optionally replace the removed data with corresponding predicted data generated by the riser sensor data predictor 155'.

The riser lifecycle management program products 120 and/or riser asset management program product 120' beneficially can interface with a riser tension management program product 170 which can record and manage riser tension, or alternatively, can include various program elements to perform such function. Accordingly, an embodiment of the present convention can provide a riser tensioner recorder 171, a riser tensioner manager, and a vortex induced vibration alert manager. The riser tensioner recorder 171 can function to record tension settings, applied riser tension, and tensioner stroke for a riser tensioner system connected to a marine riser string 23. The riser tensioner manager 173 can function to provide data usable by a controller 39 of a riser tensioner system 35, 35', to adjust a tensioner setting to continually apply optimum riser tension responsive to riser stress data determined from the received load data. The vortex induced vibration alert manager 175 can function to detect an impending or ongoing vortex induced vibration condition and approximate location thereof along a length of the marine riser string 23 when existing responsive to at least the received load data, to signal an emergency alert thereof responsive to detecting the vortex induced vibration condition, and to determine an action to reduce or mitigate the detected vortex induced vibration. If implemented in the riser lifecycle management program product 120, such program element provides a backup for the vessel 27, albeit, potentially with a significant lag.

Embodiments of the present invention also include various methods relating to monitoring and managing a plurality of marine riser assets. According to an embodiment of the present invention, a method of monitoring and managing a plurality of marine riser assets can include the steps of receiving riser joint identification data from a riser joint identification sensor 73 positioned within a well bay 31 for each of a plurality of riser joints 29 (or other riser assets of interest) during deployment from the respective vessel 27 to form a marine riser string 23, and determining a relative deployed position location of the each of the riser joints 29 deployed from the vessel 27 to form the marine riser string 23. Each of the riser joints 29 correspondingly include indicia (e.g., RFID tag 71) readable by a riser joint identification sensor 73 to separately identify each one of the riser joints 29 from each other of the riser joints 29. The method can also include receiving load data for each of the riser joints 29 from a plurality of riser joint measurement instrument modules 91, and monitoring loading of each of the deployed riser joints 29 responsive to the load data provided by the riser joint measurement instrument modules 91.

The method can also include estimating a riser joint loading condition for each of the deployed riser joints 29 in response to the load data of one or more of the deployed riser joints 29, and providing an alarm in response to the estimated loading condition nearing an operating design or service envelope one or more of the deployed riser joints 29. The method can also, or alternatively, include estimating fatigue damage to the deployed riser joints 29 in response to the load data of the one or more of the deployed riser joints, and providing an alarm in response to the estimated fatigue damage exceeding a preselected operational limit. The method can also, or alternatively, include detecting an anomaly in the load data of one or more of the deployed riser joints 29, when existing, and providing an alarm in response to the detection of the anomaly.

The method can also, or alternatively, include receiving load data for each of the riser joints 29 from a plurality of riser joint measurement instrument modules 91, monitoring loading of each of the deployed riser joints in response to the load data provided by the riser joint measurement instrument modules 91, monitoring tension settings, applied riser tension, and tensioner stroke of a tensioning system 35, 35', and providing data to a tensioner controller 39 to control adjusting the tensioning system tension settings to continually apply optimum riser tension in response to the load data.

According to another embodiment of the present invention, a method of monitoring and managing a plurality of marine riser assets includes the steps of determining a relative deployed position location of the each of a plurality of riser joints 29 (or other riser assets of interest) deployed from a vessel 27 to form a marine riser string 23, receiving load data for each of the deployed riser joints 29 from a plurality of riser joint measurement instrument modules 91 connected to at least a subset of the deployed riser joints 29, monitoring loading of each of the deployed riser joints 29 in response to the load data provided by the riser joint measurement instrument modules 91, estimating a riser joint loading condition for each of the deployed riser joints 29 in response to the load data of one or more of the plurality of deployed riser joints 29, and providing an alarm in response to the estimated loading condition nearing an operating design or service envelope for one or more of the deployed riser joints 29.

The method can also include a shipboard computer 41 sending riser joint deployment location data and relative deployed position location and loading data for the deployed riser joints 29 to a central database warehouse (e.g., data warehouse 63) located remote from the vessel 27 and adapted to receive such data from a plurality of such vessels 27 each deploying riser joints 29 forming one or more riser strings 23. The method can also or alternatively include detecting an impending or ongoing vortex induced vibration condition and approximate location thereof along a length of the riser string 23, and adjusting tensioning of the riser string 23 to reduce or mitigate the detected vortex induced vibration condition.

According to another embodiment of the present invention, a method of monitoring and managing a plurality of marine riser assets, e.g., positioned at one or more separate vessel locations, can include the steps of receiving riser joint deployment and location data for each one of a plurality of deployed riser joints 29 (or other riser assets of interest) deployed at one of a plurality of separate vessel locations carrying the respective riser joint 29, receiving from an associated shipboard computer 41, riser joint load history data for each of the riser joints 29 deployed at the plurality of separate vessel locations, transforming riser joint load history data received in the time domain into load history data in the frequency domain, and determining a level of damage of each of the deployed riser joints 29 in response to the received riser joint load history data and/or the transformed riser joint load history data.

The method can also, or alternatively, include estimating remaining riser joint serviceable life in response to riser joint material properties for each respective riser joint 29 and the received riser joint load history data and/or the transformed riser joint load history data, scheduling routine maintenance events for each of the deployed riser joints 29, and scheduling an unscheduled (e.g., immediate action or emergency) maintenance event in response to a load history anomaly (e.g., unexpected incident) in the received riser joint load history data resulting in engagement of a preset operational life trigger level requiring inspection. The method can also, or alternatively, further include reconstructing a riser string configuration of any one of the riser joints 29 deployed at any one of the plurality of separate vessel locations from the riser joint deployment and location data associated with the respective riser string 23, and predicting a magnitude of a load imposed on a subsea wellhead system 25 associated with the respective riser string 23 from corresponding riser load history data for at least a subset of a plurality of riser joints 29 forming the respective riser string 23. Note, each riser joint 29 need not have a respective instrument module 91 attached thereto. Still further, the method can also, or alternatively, include sending riser load history data in the frequency domain for each one of the plurality of deployed riser joints 29 to the respective shipboard computer 41 located at the associated one of the plurality of vessel locations carrying the respective deployed riser joint 29.

It is important to note that while embodiments of the present invention have been described in the context of a fully functional system, those skilled in the art will appreciate that the mechanism of at least portions of the present invention and/or aspects thereof are capable of being distributed in the form of a computer readable medium in a variety of forms storing instructions for execution on a processor, processors, or the like, and that the present invention applies equally regardless of the particular type of signal bearing media used to actually carry out the distribution. Examples of the computer readable media include but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, and other newer types of memories, and transmission type media such as digital and analog communication links capable of storing instructions. Such media can include both operating instructions and operations instructions related to the riser lifecycle management program products 120, the riser asset management program product 120', the riser tension or management program product 170, and the computer executable method steps, described above.

Embodiments of the present invention provide several advantages. For example, embodiments of the present invention provide a system including a central database that can be used by field and maintenance personnel to maintain and communicate critical riser information. Such central database also advantageously can provide early visibility of upcoming maintenance event and plan them accordingly. The warehousing of marine riser data can advantageously result in a number of other opportunities for the management and maintenance of marine field development assets. For example, the riser load history information can be used to improve riser joint design, which is linked to having better knowledge of actual riser load history. Additionally, the riser load history information for a given drilling or production operation, through extrapolation or by a separate riser analysis program, can be used to predict the magnitude of the loads imposed on the subsea wellhead system. This information, in turn, can then be used to optimize the configuration of upcoming subsea wells in the same general area (i.e., same field development). Embodiments of the present invention also advantageously allow for substantial fault tolerance in the subsystem that is deemed to be most vulnerable, namely the data telemetry equipment, along with additional fault tolerance features.

Embodiments of the present invention also provide sufficient flexibility to communicate across third-party assets. For example, the database can retain the riser tensioner key parameters such as stroke and applied riser tension. Such systems integration, along with real-time load data, can allow direct manipulation of the riser tensioning system to improve performance and extend the life of riser joints.

Embodiments of the system can automatically notify the user of both routine and unscheduled maintenance events. A routine maintenance event is one that is scheduled sometime in advance, but may have been aided by load history information in the database. An unscheduled maintenance event is one associated with an unexpected incident. For example, one or more riser joints in a string that has been subjected to a direct hit by a hurricane may reach a preset fatigue life trigger level, requiring an inspection of the riser joint at the very least. In such a scenario, the operator would have a high degree of confidence that the remaining riser assets are suitable for marine deployment, reducing the down time associated with inspection of the entire riser string. Embodiments of the system can also automatically notify the user of both routine and unscheduled maintenance events.

This application is a continuation of U.S. patent application Ser. No. 12/029,376, titled "Riser Lifecycle Management System, Program Product, and Related Methods," filed on Feb. 11, 2008, and is related to U.S. patent application Ser. No. 10/951,563, now U.S. Pat. No. 7,328,741, titled "System for Sensing Riser Motion," filed on Sep. 28, 2004, each incorporated herein by reference in its entirety.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification. For example, although the description primarily focuses on application to drilling platforms and drilling risers, embodiments of the present invention equally apply to TLP and SPAR production platforms/risers.

The invention claimed is:

1. A method of monitoring and managing a plurality of marine riser assets, the method comprising the steps of:
   operationally deploying a plurality of riser joints from a vessel to form an operationally deployed marine riser string;
   reading riser joint identification data from a riser joint identification indicator for each of the plurality of riser joints during the operational deployment thereof, the riser joint identification indicator connected to the respective riser joint and carrying or containing information about the respective riser joint sufficient to separately identify the respective riser joint of the plurality of riser joints being deployed from each other of the plurality of riser joints during subsea deployment, the reading of the riser joint identification data from each of the plurality of riser joints performed by a riser joint identification sensor;
   identifying the respective riser joint being operationally deployed to thereby track the deployment thereof responsive to the riser joint identification data read from the respective riser joint identification indicator;
   receiving load data for each of the plurality of riser joints from a corresponding plurality of riser joint measurement instrument modules connected thereto; and
   performing one or more of the following steps:
      detecting an anomaly in the load data of one or more of the plurality of deployed riser joints when existing, and
      estimating fatigue damage to each of the plurality of deployed riser joints responsive to the load data of the one or more of the plurality of deployed riser joints.

2. A method as defined in claim 1, further comprising the step of:
   tracking the subsea deployment of each of the plurality of riser joints.

3. A method as defined in claim 1, wherein each riser joint identification indicator comprises a radio frequency identification indicator.

4. A method as defined in claim 3, further comprising the step of:
   recording a timestamp indicating when each respective riser joint of the plurality of riser joints is deployed.

5. A method as defined in claim 1, wherein each riser joint identification indicator comprises a barcode.

6. A method as defined in claim 1, wherein each riser joint identification indicator comprises a contact memory button.

7. A method as defined in claim 1, further comprising the steps of:
   retrieving one or more riser joints of the plurality of operationally deployed riser joints;
   reading riser joint identification data from the riser identification indicator of the respective one or more riser joints during retrieval thereof, the information carried or contained by the corresponding one or more riser identification indicators being sufficient to separately identify each riser joint being retrieved from each other of the plurality of riser joints; and
   identifying the respective one or more riser joints being retrieved to thereby track the retrieval thereof responsive to the riser joint identification data read from the respective riser joint identification indicator.

8. A method as defined in claim 7, further comprising the step of:
   tracking the subsea deployment and retrieval of each of the plurality of riser joints.

9. A method as defined in claim 8, wherein each riser joint identification indicator comprises a radio frequency identification indicator.

10. A method as defined in claim 8, further comprising the steps of:
    recording a timestamp indicating when each respective riser joint of the plurality of riser joints is deployed; and
    recording a timestamp indicating when each respective riser joint of the plurality of riser joints is retrieved.

11. A method as defined in claim 8, wherein the deployment and retrieval of the plurality of riser joints is through a well bay of the vessel, and wherein the reading of riser joint identification data during deployment of the plurality of riser joints and the reading of riser joint identification data during retrieval of the plurality of riser joints is performed by a riser joint identification sensor positioned within the well bay.

12. A method as defined in claim 1, further comprising the steps of:
    receiving the riser joint identification data from a riser joint identification sensor positioned within a well bay of the vessel during deployment of the plurality of riser joints; and
    virtually constructing the marine riser string configuration responsive to the riser joint identification data for each of the plurality of riser joints received during deployment thereof.

13. A method as defined in claim 1, further comprising the step of:
    determining a relative deployed position location of the each of the plurality of riser joints deployed from the vessel.

14. A method as defined in claim 13, wherein the relative deployed position location comprises a position location of the respective deployed riser joint along a length of the deployed marine riser string relative to other of the plurality of deployed riser joints, the waterline, or other relative position reference.

15. A method as defined in claim 1, wherein the method comprises the step of:
    estimating fatigue damage to each of the plurality of deployed riser joints responsive to the load data of the one or more of the plurality of deployed riser joints.

16. A method as defined in claim 15, further comprising the step of:
    providing an alarm responsive to the estimated fatigue damage of one or more of the plurality of deployed riser joints exceeding a preselected operational limit.

17. A method as defined in claim 1, wherein the method comprises the step of:

detecting an anomaly in the load data of one or more of the plurality of deployed riser joints when existing.

18. A method as defined in claim 17, further comprising the step of:
providing an alarm responsive to the detection of the anomaly.

19. A method as defined in claim 1, further comprising the steps of:
monitoring loading of each of the plurality of deployed riser joints responsive to the load data provided by the plurality of riser joint measurement instrument modules;
estimating a riser joint loading condition for each of the plurality of deployed riser joints responsive to the load data of one or more of the plurality of deployed riser joints; and
providing an alarm responsive to the estimated loading condition nearing an operating design or service envelope for one or more of the plurality of deployed riser joints.

20. A method as defined in claim 1, wherein each of the plurality of riser joints carries a riser joint measurement instrument module, the method further comprising the step of:
comparing sensor readings of a riser joint measurement instrument module associated with one or more of the plurality of deployed riser joints forming the deployed riser string to sensor readings for at least two adjacent riser joints of the plurality of deployed riser joints forming the riser string to thereby determine an integrity of the riser joint measurement instrument module and to flag sensor readings emanating from the respective instrument module when the integrity is determined to be questionable.

21. A method as defined in claim 20, further comprising the steps of:
removing flagged data associated with a faulty instrument module from active record data; and
optionally replacing the removed data with corresponding predicted data generated by a riser sensor data predictor.

22. A method as defined in claim 1, wherein each of the plurality of riser joints carries a riser joint measurement instrument module, the method further comprising the steps of:
identifying a malfunctioning riser joint measurement instrument module associated with one or more of the plurality of deployed riser joints forming the marine riser string; and
signaling one or more adjacent riser joint measurement instrument modules to bypass the malfunctioning riser joint measurement instrument module to thereby provide substantially continuous load data acquisition for each riser joint measurement instrument module positioned below the malfunctioning riser joint measurement instrument module.

23. A method of monitoring and managing a plurality of marine riser assets, the method comprising the steps of:
operationally deploying a plurality of riser joints from a vessel to form an operationally deployed marine riser string;
reading riser joint identification data from a riser joint identification indicator for each of the plurality of riser joints during the operational deployment thereof, the riser joint identification indicator connected to the respective riser joint and carrying or containing information about the respective riser joint sufficient to separately identify the respective riser joint of the plurality of riser joints being deployed from each other of the plurality of riser joints during subsea deployment, the reading of the riser joint identification data from each of the plurality of riser joints performed by a riser joint identification sensor;
identifying the respective riser joint being operationally deployed to thereby track the deployment thereof responsive to the riser joint identification data read from the respective riser joint identification indicator; and
predicting a magnitude of a load imposed on a subsea wellhead system associated with the riser string responsive to corresponding riser load data for at least a subset of a plurality of riser joints forming the marine riser string.

24. A method of monitoring and managing a plurality of marine riser assets, the method comprising the steps of:
operationally deploying a plurality of riser joints from a vessel to form an operationally deployed marine riser string;
reading riser joint identification data from a riser joint identification indicator for each of the plurality of riser joints during the operational deployment thereof, the riser joint identification indicator connected to the respective riser joint and carrying or containing information about the respective riser joint sufficient to separately identify the respective riser joint of the plurality of riser joints being deployed from each other of the plurality of riser joints during subsea deployment, the reading of the riser joint identification data from each of the plurality of riser joints performed by a riser joint identification sensor;
identifying the respective riser joint being operationally deployed to thereby track the deployment thereof responsive to the riser joint identification data read from the respective riser joint identification indicator;
receiving riser joint deployment location data and relative deployed position location data for each of the plurality of deployed riser joints from each of the plurality of vessels by a central database warehouse located remote from the vessel and adapted to receive such data from the plurality of vessels; and
virtually constructing a riser string configuration of any one of the respective plurality of riser joints deployed at any one of the plurality of separate vessel locations responsive to the riser joint deployment and position location data associated with the respective marine riser string.

25. A method as defined in claim 24, further comprising the steps of:
receiving from each of the plurality of vessels, riser load history data for each of the plurality of deployed riser joints by the central database warehouse; and
predicting a magnitude of a load imposed on a subsea well equipment associated with the respective riser string responsive to corresponding riser load history data for at least a subset of a plurality of riser joints forming the respective riser string.

26. A method of monitoring and managing a plurality of marine riser assets, the method comprising the steps of:
operationally deploying a plurality of riser joints from a vessel to form an operationally deployed marine riser string, wherein each of the plurality of riser joints carries a riser joint measurement instrument module;
reading riser joint identification data from a riser joint identification indicator for each of the plurality of riser joints during the operational deployment thereof, the riser joint identification indicator connected to the respective riser joint and carrying or containing information about the respective riser joint sufficient to separately identify the respective riser joint of the plurality of riser joints being deployed from each other of the plurality of riser joints during subsea deployment, the reading of the riser joint identification data from each of the plurality of riser joints performed by a riser joint identification sensor;

identifying the respective riser joint being operationally deployed to thereby track the deployment thereof responsive to the riser joint identification data read from the respective riser joint identification indicator; and receiving load data for each of the plurality of riser joints from a plurality of riser joint measurement instrument modules, the load data provided through relay of the data from each of the plurality of riser joints to a riser joint positioned adjacent the respective riser joint until reaching a riser load data receiver.

27. A method as defined in claim 26, further comprising the steps of:

monitoring loading of each of the plurality of deployed riser joints responsive to the load data provided by the plurality of riser joint measurement instrument modules; and estimating a riser joint loading condition for each of the plurality of deployed riser joints responsive to the load data of one or more of the plurality of deployed riser joint.

28. A method as defined in claim 27, further comprising the step of:

providing an alarm responsive to the estimated loading condition nearing an operating design or service envelope of one or more of the plurality of deployed riser joints.

29. A method as defined in claim 26, further comprising the steps of:

monitoring loading of each of the plurality of deployed riser joints responsive to the load data provided by the plurality of riser joint measurement instrument modules; and monitoring tensioning system tension settings, applied riser tension, and tensioner stroke.

30. A method as defined in claim 29, further comprising the step of:

providing data to control adjusting the tensioning system tension settings to automatically apply riser tension responsive to the load data.

31. A method of monitoring and managing a plurality of marine riser assets, the method comprising the steps of:

operationally deploying a plurality of riser joints from a vessel to form an operationally deployed marine riser string;

reading riser joint identification data from a riser joint identification indicator for each of the plurality of riser joints during the operational deployment thereof, the riser joint identification indicator connected to the respective riser joint and carrying or containing information about the respective riser joint sufficient to separately identify the respective riser joint of the plurality of riser joints being deployed from each other of the plurality of riser joints during subsea deployment, the reading of the riser joint identification data from each of the plurality of riser joints performed by a riser joint identification sensor;

identifying the respective riser joint being operationally deployed to thereby track the deployment thereof responsive to the riser joint identification data read from the respective riser joint identification indicator; and recording a timestamp indicating when each respective riser joint of the plurality of riser joints is deployed.

32. A method as defined in claim 31, further comprising the step of:

determining a relative deployed position location of the each of the plurality of riser joints deployed from the vessel.

33. A method as defined in claim 32, wherein the relative deployed position location comprises a position location of the respective deployed riser joint along a length of the deployed marine riser string relative to other of the plurality of deployed riser joints, the waterline, or other relative position reference.

34. A method as defined in claim 33, wherein each riser joint identification indicator comprises a radio frequency identification indicator and the riser joint identification sensor comprises a radio frequency identification reader.

35. A method as defined in claim 31, further comprising the step of:

recording a timestamp indicating when each respective riser joint of the plurality of riser joints is retrieved.

\* \* \* \* \*